United States Patent
Reeves et al.

(10) Patent No.: US 9,734,139 B2
(45) Date of Patent: Aug. 15, 2017

(54) AUDITING AND TRACKING CHANGES OF DATA AND CODE IN SPREADSHEETS AND OTHER DOCUMENTS

(75) Inventors: Andrew Reeves, Hythe (GB); James Culverwell, Bournemouth (GB); Aaron Wittman, London (GB)

(73) Assignee: Cluster Seven Limited, London (GB)

( * ) Notice: Subject to any disclaimer, the term of this patent is extended or adjusted under 35 U.S.C. 154(b) by 2074 days.

(21) Appl. No.: 11/461,087

(22) Filed: Jul. 31, 2006

(65) Prior Publication Data

US 2007/0011211 A1 Jan. 11, 2007

Related U.S. Application Data

(63) Continuation-in-part of application No. PCT/GB2005/000529, filed on Feb. 14, 2005.

(51) Int. Cl.
*G06F 17/00* (2006.01)
*G06F 17/24* (2006.01)
*G06F 17/22* (2006.01)

(52) U.S. Cl.
CPC ........ *G06F 17/246* (2013.01); *G06F 17/2211* (2013.01); *G06F 17/2288* (2013.01)

(58) Field of Classification Search
CPC . G06F 17/2211; G06F 17/246; G06F 17/2288
(Continued)

(56) References Cited

U.S. PATENT DOCUMENTS 5,303,146 A * 4/1994 Ammirato et al. ............ 715/204
5,499,180 A * 3/1996 Ammirato ............. G06F 3/0489
715/204
(Continued)

FOREIGN PATENT DOCUMENTS

WO WO 2005/081126 A2 9/2005
WO WO 2005/081126 A3 9/2005

OTHER PUBLICATIONS

Eisenberg; "OASIS OpenDocument Essentials Using OASIS OpenDocument XML;" http://web.archive.org/web/20031209021026/http://books.evc-cit.info/chor.php; Dec. 9, 2003; 303 pages.
(Continued)

*Primary Examiner* — Cesar Paula
*Assistant Examiner* — David Faber
(74) *Attorney, Agent, or Firm* — Daly, Crowley, Mofford & Durkee, LLP

(57) ABSTRACT

A system for monitoring and auditing data in one or more spreadsheets comprises a file store within which files containing spreadsheet data can be stored, a database, and monitoring means. The monitoring means is operative to detect changes in spreadsheet data within the file store and to record the changes in the database. The system may comprise an entity selector for selecting entities in a spreadsheet, and a tracker for tracking the shift in position of entities. An offset determinator derives offset values representing the shift in position of the entities. An offset applicator applies the offset values to the spreadsheet data before comparing the spreadsheet data with a version of the spreadsheet data at a different time point. In a further aspect, the invention provides a system for processing and storing spreadsheets.

14 Claims, 21 Drawing Sheets

(58) Field of Classification Search
USPC ...... 707/203, 204, 10, 4, 634; 715/203, 204,
715/212–213, 220, 229, 255
See application file for complete search history.

(56) References Cited

U.S. PATENT DOCUMENTS

| | | | | |
|---|---|---|---|---|
| 5,671,428 | A * | 9/1997 | Muranaga et al. | 715/751 |
| 5,806,078 | A * | 9/1998 | Hug | G06F 17/2288 |
| | | | | 707/999.202 |
| 6,006,239 | A * | 12/1999 | Bhansali et al. | |
| 6,157,934 | A * | 12/2000 | Khan | G06Q 10/10 |
| | | | | 709/203 |
| 6,438,565 | B1 * | 8/2002 | Ammirato | G06F 3/0489 |
| | | | | 715/204 |
| 6,526,418 | B1 * | 2/2003 | Midgley et al. | 707/640 |
| 2002/0169799 | A1 * | 11/2002 | Voshell | G06F 17/246 |
| | | | | 715/212 |
| 2002/0188629 | A1 * | 12/2002 | Burfoot | G06F 17/246 |
| | | | | 715/213 |
| 2003/0126056 | A1 * | 7/2003 | Hausman et al. | 705/36 |
| 2004/0162833 | A1 * | 8/2004 | Jones et al. | 707/100 |
| 2005/0193031 | A1 * | 9/2005 | Midgley | G06F 11/1451 |

OTHER PUBLICATIONS

Goldwater et al.; "Collaborate on Spreadsheets;" Journal of Accountancy Online Issues; http://wwww.aicpa.org/pubs/jofa/jan2004/gold.htm; Jan. 2004; 8 pages.
Office Action dated Mar. 3, 2010 for European Appl. No. 05 708 347.9; 5 pages.

\* cited by examiner

*FIG. 19*

Results: 0.00 secs.

| Line | Text (Source) | | Line | Text (Destination) |
|---|---|---|---|---|
| 00001 | Attribute VB_Name="Module1" | | 00001 | Attribute VB_Name="Module1" |
| 00002 | | | 00002 | |
| 00003 | | | 00003 | |
| 00004 | | | 00004 | |
| 00005 | | | 00005 | |
| 00006 | | | 00006 | |
| 00007 | Public Function GetResult(ByVal CallPutFlag As String,_ | | 00007 | Public Function GetResult(ByVal CallPutFlag As String,_ |
| 00008 | ByVal SpotPrice As Double,_ | | 00008 | ByVal SpotPrice As Double,_ |
| 00009 | ByVal StrikePrice As Double,_ | | 00009 | ByVal StrikePrice As Double,_ |
| 00010 | ByVal DaysToMaturity As Long,_ | | 00010 | ByVal DaysToMaturity As Long,_ |
| 00011 | ByVal Volatility As Double,_ | | 00011 | ByVal Volatility As Double,_ |
| 00012 | ByVal InterestRate As Double, ByVal ReturnFlag As String) | | 00012 | ByVal InterestRate As Double, ByVal ReturnFlag As String) |
| 00013 | | | 00013 | |
| 00014 | On Error GoTo errorhandler | | 00014 | On Error GoTo errorhandler |
| 00015 | Dim price As Double | | 00015 | Dim price As Double |
| 00016 | Dim delta As Double | | 00016 | Dim delta As Double |
| 00017 | Dim gamma As Double | | 00017 | Dim gamma As Double |
| 00018 | Dim vega As Double | | 00018 | Dim vega As Double |
| 00019 | Dim returnval As Double | | 00019 | Dim returnval As Double |
| 00020 | Dim j AS New Pricing | | 00020 | Dim j AS New Pricing |
| 00021 | | | 00021 | |
| 00022 | | | 00022 | |
| 00023 | Uncommenting one of the following will switch to different .dll fror pricing | | 00023 | Uncommenting one of the following will switch to different .dll fror pricing |
| 00024 | | | 00024 | |
| 00025 | The following is for correct Black Scholes pricing | | 00025 | The following is for correct Black Scholes pricing |
| 00026 | Dim jAs New Pricingdll Pricing | | 00026 | Dim jAs New Pricingdll Pricing |
| 00027 | | | 00027 | |
| 00028 | The following is for 1.1 Black Scholes pricing | | 00028 | The following is for 1.1 Black Scholes pricing |
| 00029 | Dim j As New Pricingdll4 Pricing | | 00029 | Dim j As New Pricingdll4 Pricing |
| 00030 | | | 00030 | |
| 00031 | The following returns 999.0 for all values | | 00031 | The following returns 999.0 for all values |
| 00032 | Dim j As New Pricingdll2 Pricing | | 00032 | Dim j As New Pricingdll2 Pricing |
| 00033 | | | 00033 | |
| 00034 | The following returns 333.0 for all values | | 00034 | The following returns 333.0 for all values |
| 00035 | Dim j As New Pricingdll Pricing | | 00035 | Dim j As New Pricingdll Pricing |
| 00036 | | | 00036 | |
| 00037 | | | 00037 | |
| 00038 | | | 00038 | |
| 00039 | j BlackScholes CallPutFlags, SpotPrice, StrikePrice, DaysToMaturity, Volatility, | | 00039 | j BlackScholes CallPutFlags, SpotPrice, StrikePrice, DaysToMaturity, Volatility, |
| 00040 | | | 00040 | |
| 00041 | Select Case UCase(ReturnFlag) | | 00041 | Select Case UCase(ReturnFlag) |
| 00042 | Case "PRICE" | | 00042 | Case "PRICE" |
| 00043 | returnval=price | | 00043 | returnval=price |
| 00044 | Case "DELTA" | | 00044 | Case "DELTA" |

AUDITING AND TRACKING CHANGES OF DATA AND CODE IN SPREADSHEETS AND OTHER DOCUMENTS

CROSS REFERENCE TO RELATED APPLICATION

This application is a Continuation-in-Part (CIP) of International Patent Application PCT/GB2005/000529 filed Feb. 14, 2005, published as WO2005/081126, which application claims priority from GB application number 0403059.9, filed Feb. 12, 2004.

FIELD OF THE INVENTION

This invention relates to the storage and processing of spreadsheets and other documents, including: auditing and tracking changes of data and code in spreadsheets and other documents, and compression of spreadsheets and other documents.

BACKGROUND OF THE INVENTION

A spreadsheet application is a computer program that allows a user to manipulate two-dimensional and three-dimensional arrays of data. A user of a spreadsheet application is presented with a two-dimensional array of cells, each cell being capable of storing an entity such as an item of numeric data, text, a software object, or a formula. A three-dimensional spreadsheet has several of such arrays having a definite order. Where a cell contains a formula, the display normally shows the result of the calculation that the formula defines. The formula can include amongst its input variables the value of another cell within the spreadsheet or within another spreadsheet. Of course, the value of the other cell may be the result of calculation of a formula within the other cell. Such linkage between cells can be extended to an arbitrary degree of complexity.

Spreadsheets were conceived as tools to be used for performing quick calculations on personal data. In contrast, data and functionality that are critical to the operations of an organisation would traditionally have been stored in databases supporting computer applications that have been developed by programmers to perform specific, controlled actions on the data. Computer spreadsheets have become ubiquitous in many organisations as a result of the growth in power of personal computers. Therefore, in practice, this traditional model of how data is managed is no longer followed in many organisations. Spreadsheets that were hurriedly put together to perform a calculation that the programmed database lacked have become essential tools central to the work of their creators, and, effectively, central to the operation of the business.

In the present situation, the features of spreadsheets that make them very attractive to their users become unwelcome from the point of view of the organisation as a whole. A spreadsheet can be changed very easily. However, the interconnected nature of the cells in a spreadsheet can mean that the consequences of such a change can be very difficult to foresee. This is especially so in cases where the spreadsheet is referenced by another spreadsheet, possibly developed by another person. It is also not possible to determine the content of a spreadsheet at any given moment, so that the reasons behind a conclusion being drawn from the content of a spreadsheet may not be traceable. Moreover, the power of modern personal computers is such as to make practicable implementation of a scripting language in spreadsheet applications to perform calculations and actions of arbitrary complexity. Yet this code is not subject to version control and change tracking familiar to programmers in traditional programming languages.

Clearly, this situation is unacceptable in a large organisation since it renders the quality control of data and functionality impossible, and provides an obstacle to creation of auditable business activity (such as preparation of accounts) within the business that are required as a deterrent to financial mismanagement.

In commercial applications, often many spreadsheets are required and the size of each spreadsheet can become large. This results in a significant amount of memory being required to store all of the spreadsheets. Typically, 70% of cells in a spreadsheet contain formulas. Formulas are usually stored as character strings whose size often exceeds the number of characters in the resulting value derived from the formula. For these reasons, the space used to store formulas within a spreadsheet can represent a significant proportion of the overall space used. For example, up to 90% of the space used in a spreadsheet may be used to store formulas. Furthermore, typically, a very high proportion of the formulas in a spreadsheet are duplicated. It is a common scenario for example for formula use to create a formula at the top of a column and then drag it down applying the formula to the cells underneath. In some cases, up to 99.5% of formulas within a spreadsheet are duplicated.

An aim of this invention is to provide a mechanism whereby actions performed upon a spreadsheet can be recorded in such a manner that the state of the spreadsheet at any particular time can be recovered and the evolution between states can be interrogated.

A further aim of the invention is to determine changes in a spreadsheet in such a way that actions such as row and column insertions and deletions and sorting actions which cause significant numbers of entities in the spreadsheet to shift are taken into account.

A further aim of this invention is to provide a mechanism whereby entities such as formulas occurring within a spreadsheet may be stored in a more efficient manner.

It is a further aim of the invention that the inherent flexibility of the spreadsheet, which makes it so attractive, is not lost.

SUMMARY OF THE INVENTION

From a first aspect, this invention provides a system for monitoring and auditing data in one or more spreadsheets, the system comprising a file store within which files containing spreadsheet data can be stored, a database, and monitoring means; the monitoring means being operative to detect changes in spreadsheet data within the file store, and to record the changes in the database.

By storing suitable data within the database, it is possible to construct a complete history of all changes made to an individual spreadsheet.

The file store may be constituted in many different forms in different embodiments of the invention, and it may include many different components. For example, it may include one or more of a file server and a workstation computer. Components of the file store may be at diverse locations and interconnected by local-area or wide-area network links. Likewise, the monitoring means may access the file store using local-area or wide-area network links. The monitoring means most preferably includes a file location module that searches the file store for spreadsheets that are to be monitored.

In a typical embodiment, the monitoring means includes comparison means operative to compare a file in the file store (the current file) with a previous version of that file. This enables the system to determine the differences between successive and saved versions of the same file. More specifically, the comparison means may compare each cell in the current file with a corresponding cell in the previous version and, if it is determined that the content of the cell has changed, create a record of that change. Thus, changes can be recorded on a cell-by-cell basis. The record thereby created most advantageously includes data that characterises the nature of the change. Such a record can be inspected to obtain a qualitative understanding of the nature of the changes made to the spreadsheet file. The nature of the change may be classified as being one or more of: data added, data changed, data deleted, function added, function changed, function deleted, data to function, function to data, cell error, function recalculation, ¦script changes, external reference changes, named range changes, link changes, password changes, sheet added, sheet deleted, sheet renamed, spreadsheet renamed, spreadsheet deleted, spreadsheet added. It will be understood that not all embodiments may include all of these classifications and that some embodiments may include further classifications not listed here. The record may include additional data, such as a time stamp that indicates when the change was made and the identity of a user who made the change.

It is well recognised that files stored in a binary format are inherently difficult to compare with one another. Therefore, in particularly effective embodiments of the invention, a file being monitored is parsed and converted to a more easily processable form, for example a text-based format (such as, XML). XML has the further advantage that there are many tools available to process it and that it can be represented in both a text-based, serialised form and a hierarchical form.

In parallel with their development as calculation tools, spreadsheet applications have incorporated ever-more powerful scripting capability. This has evolved to the extent that spreadsheet applications can now be considered to be powerful programming environments. For example, in the case of Microsoft Excel, the programming language Visual Basic for Applications (VBA) is provided as a scripting language that is capable of implementing programmes of high complexity. As with spreadsheet data, this offers a user the ability to generate programmes quickly and flexibly. However, this flexibility means that there is little control over the development of the software. In particular, there is no version control or source code control system so it is not possible to see why changes have been made to program code after the event.

It is a further aim of this invention to provide means for managing code contained within a document such as a spreadsheet without limitation to the flexibility offered to a user.

From another aspect, this invention provides a system for monitoring and auditing program code in one or more documents, the system comprising a file store within which files containing documents can be stored, a database, and monitoring means; the monitoring means being operative to detect changes in code contained in the documents within the file store, and to record the changes in the database.

As with the previous embodiment, which is concerned with spreadsheet files, the database contains a history of changes made to the code such that the development and evolution of the code over a period of time can be monitored and audited.

Embodiments of in this aspect of the invention can work with documents of different types that contain code. For example, these may include spreadsheets, word processor documents, database files and so forth.

In many cases, both of these aspects of the invention will be provided by a common system.

From another aspect, this invention provides a computer program product, executable on computer hardware, to constitute monitoring means within an embodiment of the first aspect or second aspect of the invention.

From a further aspect, this invention provides a server for connection to the network for monitoring and auditing data in one or more spreadsheets, the network including a file store within which files containing spreadsheet data can be stored, and a database, the server being operative to detect changes in spreadsheet data within the file store, and to record the changes in the database.

Such server may constitute monitoring means in the first aspect of the invention.

In a further aspect, the invention provides a system, method and computer program product for processing and storing spreadsheets. The system comprises a determining unit arranged to determine each unique formula occurring within a spreadsheet; a first store for storing each unique formula; a second store for storing a unique identification for each unique formula; and a replacing unit arranged to replace each formula occurring within the spreadsheet with its corresponding formula identification.

Rather than storing each formula occurring within a spreadsheet, only unique formulas are stored. The formulas are stored within a formula table comprising an entry for each unique formula occurring within a spreadsheet. The formula table also stores a unique formula identification (ID) for each formula. In this way, the formulas occurring within a spreadsheet may be replaced with their corresponding formula IDs. Since only unique formulas are stored, rather then each instance of a formula in the spreadsheet, this removes redundancy resulting in a large saving of space in the spreadsheet. Additionally, the formula IDs take up a fraction of the space used to store a formula as a character string resulting in a further saving of space.

In a further aspect, the invention provides a system, method and computer program product for monitoring and auditing data in one or more spreadsheets. The system comprises: an entity selector for selecting one or more entities in a spreadsheet; a tracker for tracking the shift in position of the selected entities between two time points; an offset determinator arranged to derive one or more offset values from information received from the tracker, the offset values representing the shift in position of the entities in the spreadsheet; and an offset applicator for applying the offset values to the spreadsheet data before comparing the spreadsheet data with a version of the spreadsheet data at a different time point.

When a row or column is inserted or deleted, or when rows or columns are sorted, the noise resulting from the shifting of entities is removed before spreadsheets are compared. The entities in one or more selected rows and/or one or more selected columns form a sample of entities in the spreadsheet. The movements of the sample of entities in the spreadsheet are tracked to determine general movement of entities in the spreadsheet. Then, prior to comparison of two versions of a spreadsheet, the determined movement of the entities is applied to the earlier version of the spreadsheet before a cell-by-cell comparison between the two versions of the spreadsheet is performed. In this way, in the cell-by-cell spreadsheet comparison process, comparisons between equivalent shifted values are made rather than between values which happen to occupy the same cell.

In all of the above cases, it is preferable that operation of embodiment of the invention does not interfere with the operation of the clients and that, as far as possible, the presence of the embodiment is entirely transparent to users of the clients. To this end, it is highly preferable that the embodiment of the invention operate asynchronously of the clients on the network. Specifically, operation of the clients should not be blocked while the embodiment processes files saved within the file store.

An embodiment of the invention will now be described in detail, by way of example, and with reference to the accompanying drawings.

BRIEF DESCRIPTION OF THE FIGURES

FIGS. 16 to 19 are screenshots showing various displays generated during operation of the embodiment;

DETAILED DESCRIPTION OF PREFERRED EMBODIMENTS

An Overview of the Embodiment

Figure 1:
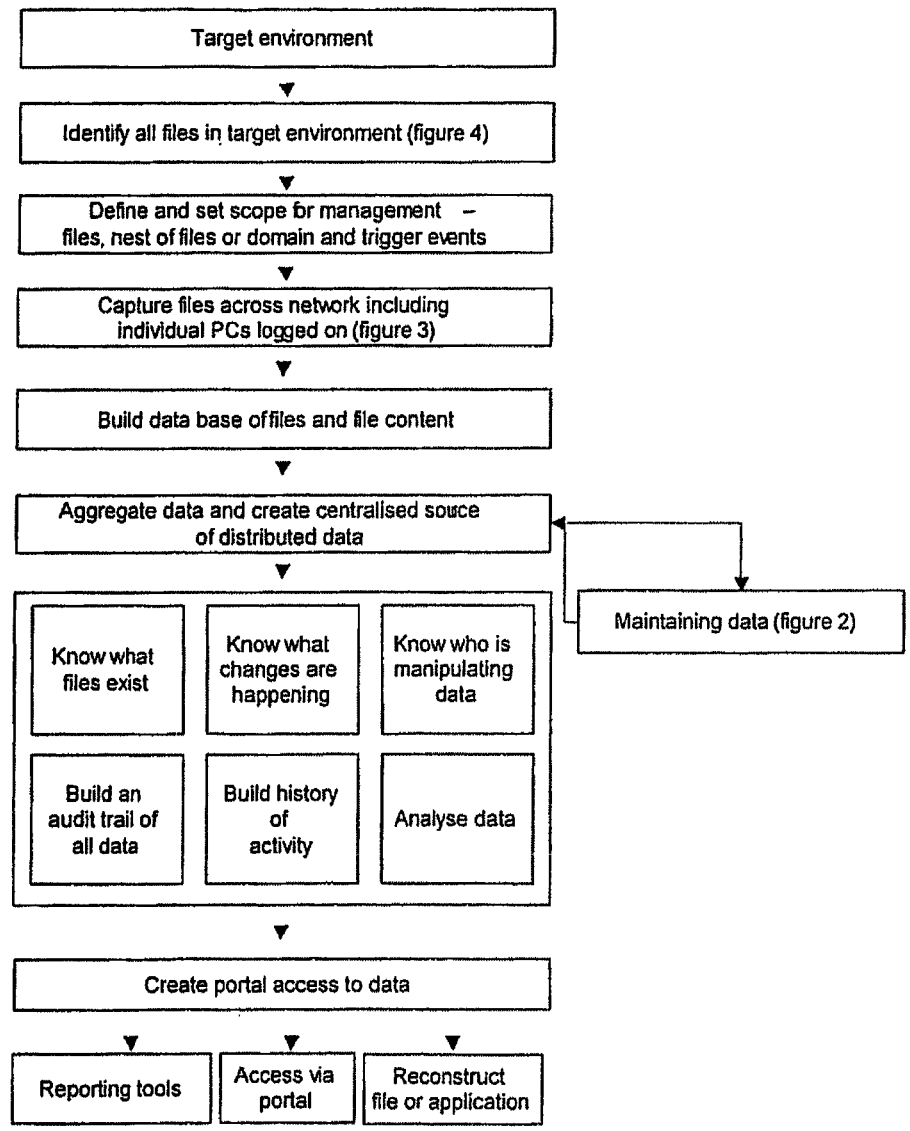
FIG. 1 is a high-level diagrammatic overview of an embodiment of the invention.

As shown in FIG. 1, the embodiment is a system that works in conjunction with an existing business desktop and networking environment. In operation, the system identifies the existence of spreadsheet files within the network, and then captures those files selected by the business for management. The system then builds a database of the content of those files. Once the first database is built, the system monitors the network for events that occur in the managed file. At selected trigger events, including (but not exclusively) a file save of a spreadsheet, the system will retrieve a copy of the file, decompose it to elemental parts and compare this with the original held in the database.

The system then saves changes made in the database. Where the file has been renamed, deleted or moved, it records this in the database. The system allows the business to view data collected in the database centrally. This system can aggregate and analyse the data using a portal employing existing technologies.

Figure 2:
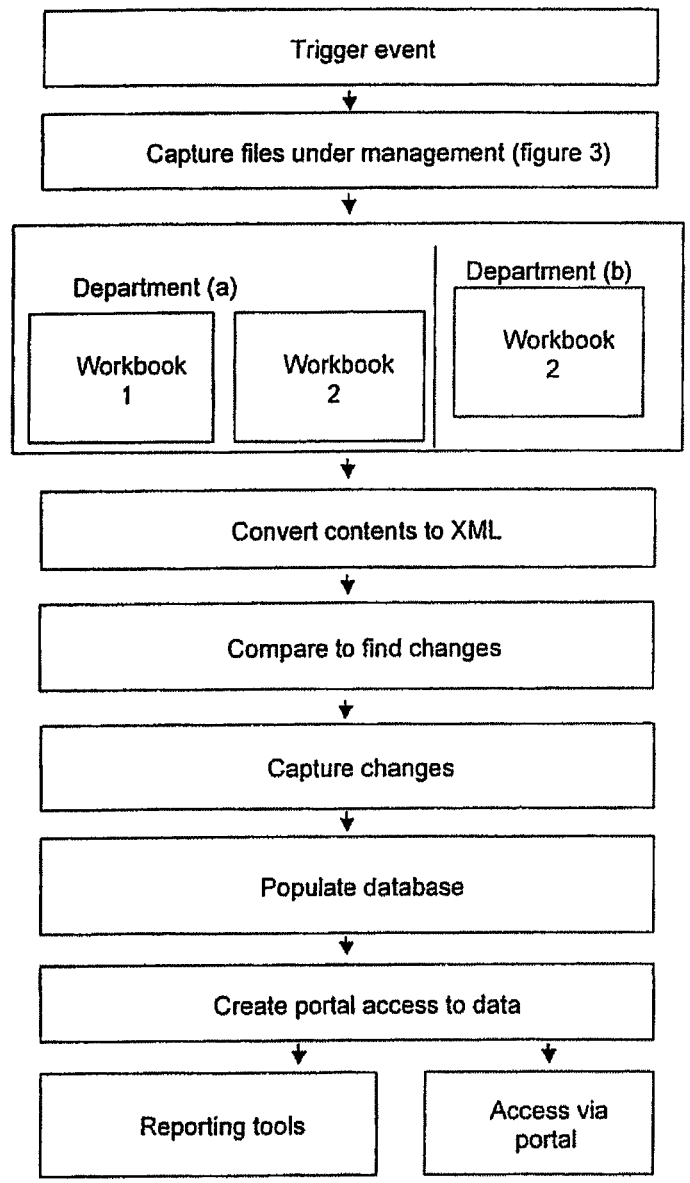
FIG. 2 illustrates a process of maintaining data in the embodiment of FIG. 1.

As shown in FIG. 2, the system can access multiple network domains to do its work in order to maintain the files under management. The system converts the contents of the files into a representation in the Extensible Markup Language (XML) and use this format to make comparisons. The system works at the most granular level to save files, track and identify and capture changes to files. The database is populated at this very granular level. The business user can apply their own reporting tools and analysis choices to the data. The invention does not restrict what is done with the data.

Figure 3:
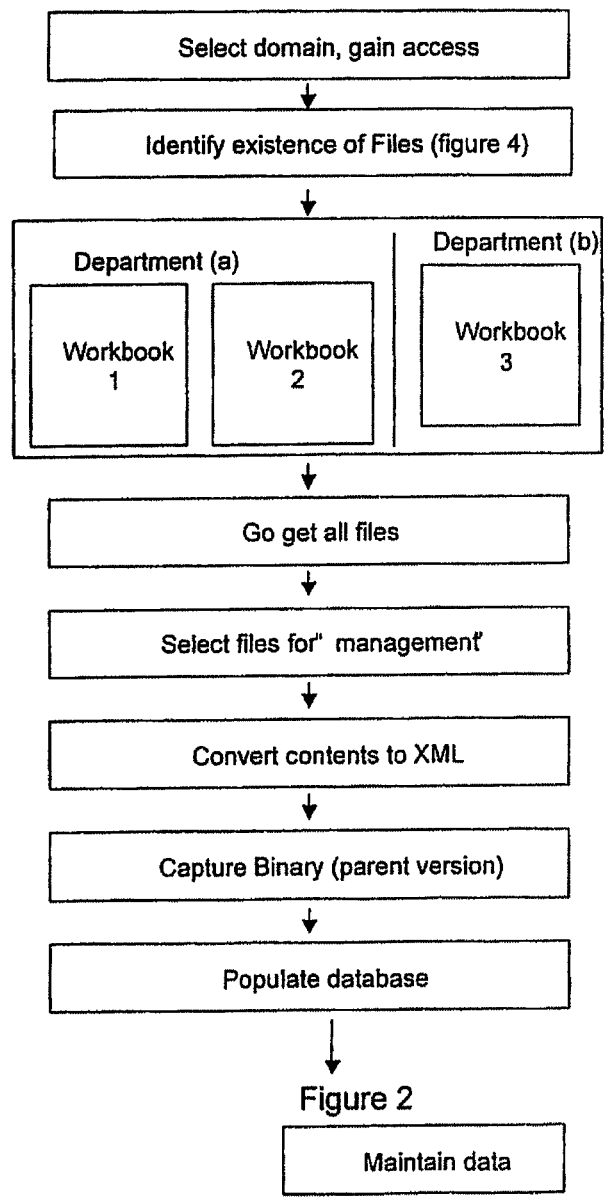
FIG. 3 illustrates a process of capturing files in the embodiment of FIG. 1.

As shown in FIG. 3, the system can work in domains where access has been given. It will seek out files, events and post event versions of the files to build a database.

Figure 4:
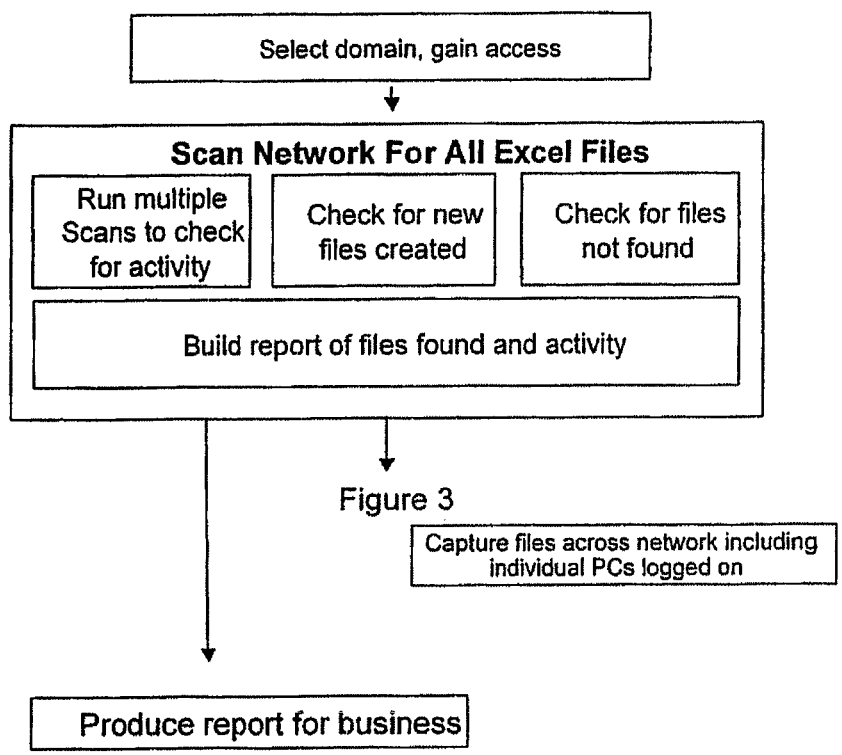
FIG. 4 illustrates a component of the embodiment of FIG. 1.

As shown in FIG. 4, the system scans targeted network environments, and pulls out the list of all files to be monitored. The invention identifies the existence of files, where new files have been created since the last scan and where files have been deleted. The scan generates a report enabling either an automatic software tool or the business to trigger the capture of files for either the start of the process (FIG. 1) or the maintenance of files (FIG. 2).

In the embodiment, when a row or column is inserted or deleted, or when rows or columns are sorted, the noise resulting from the shifting of entities is removed before spreadsheets are compared. To achieve this, the movements of a sample of entities in the spreadsheet are tracked to determine general movement of entities in the spreadsheet. Then, prior to comparison of two versions of a spreadsheet, the determined movement of the entities is applied to the earlier version of the spreadsheet before a cell-by-cell comparison between the two versions of the spreadsheet is performed.

In the embodiment, rather than storing each formula occurring within a spreadsheet, only unique formulas are stored. The formulas are stored within a formula table comprising an entry for each unique formula occurring within a spreadsheet. The formula table also stores a unique formula identification (ID) for each formula. In this way, the formulas occurring within a spreadsheet may be replaced with their corresponding formula IDs. Since only unique formulas are stored, rather then each instance of a formula in the spreadsheet, this removes redundancy resulting in a large saving of space in the spreadsheet. Additionally, the formula IDs take up a fraction of the space used to store a formula as a character string resulting in a further saving of space.

DETAILED DESCRIPTION OF THE FIGURES

As illustrated in FIG. 1 the preferred embodiment of the invention functions in a target environment, for example in an existing business desktop and networking environment. A first function of the system is to identify all files in the target environment. As illustrated in greater detail in FIG. 4, this process includes selecting and accessing the appropriate domain within the target environment, scanning the network for files and producing a report for business. A next function of the system is to define and set the scope for management. This allows specific files, nests of files or domain and trigger events to be selected by the business for management. This could include a subset of the total files which are within the set scope. A next function of the system is to capture files across the network. This process includes capturing files located within individual PCs logged on to the network. As illustrated in greater detail in FIG. 3, this process includes selecting and accessing the appropriate domain, retrieving files from various departments, converting the file contents to XML and populating a database. A next function of the system is to build a database of the files and file content. A further function of the system is aggregating data and creating a centralised store of distributed data.

An important parallel function is maintenance of the data, illustrated in more detail in FIG. 2. The various files under management may be stored in several different PCs across the network so a centralised source of data facilitates maintenance of the data. Maintenance of the data includes capturing files under management, converting the file contents to XML, comparing and capturing changes and storing the changes in a database. When storing and maintaining data it is important to know what files exist, what changes to the files are happening and who is manipulating the data. In order to know this information an audit trail of all data and a history of activity are built, and the data is analysed by the system. In order that the data resulting from the above processes may be interrogated, a next function of the system is creating portal access to the data. Access to the data via the portal may thereby be given. Access to the data may be enhanced by the provision of reporting tools and the ability to reconstruct a file or application.

The functions involved in maintaining the data stored in the processes of FIG. 1 are illustrated in FIG. 2. As a first step, a trigger event occurs such as a file save function. Next the files under management are captured, as illustrated in greater detail in FIG. 3. The files under management may include, for example, workbook files residing within different departments. Some files may be manipulated in several different locations. For example, as illustrated in FIG. 2, two workbooks may be located in department a, while a workbook may also be located in department b. In a next step of maintaining the data, the contents of the captured files are converted to XML. This format represents a convenient format for subsequent processing. In a next step the captured documents are compared with previous versions of the documents to find changes which have occurred. These changes are then captured and the database is populated with information representing the changes. Portal or client access to the data is created so that access to the data via the portal or client is provided. The reporting tools provided by the system enhance the portal access.

The functions involved in capturing files is illustrated in FIG. 3. In a first step, the appropriate domains are selected and access to the selected domains is gained by the system. The system can work in domains where access has been given. Next, the existence of files in the selected domains are identified. This process is illustrated in greater detail in FIG. 4. As described above, the files may be stored in several locations. In a next step, the system goes and gets all of the files. In a next step, the files for management are selected. The content of these files are converted to XML and the binary of the parent version of each file is captured. The database is then populated with this data.

The functions involved in capturing files across the network including individual PCs logged on to the network are illustrated in FIG. 4. As before, the appropriate domains are selected and access to those domains is gained. In a next process the system scans the targeted network environments for all relevant files to be monitored. For example, in the case where the system is used to track changes in Microsoft Excel spreadsheets, the network is scanned for all Excel files. This process includes the sub-processes of running multiple scans to check for activity, checking for new files created and checking for files not found. New files include those created since the last scan. Files may not be found, for example if files have been deleted. The results of these sub-processes are used to build a report of the files found and of the activity occurring. After the network has been scanned for files, a report for business may be produced. The report enables the triggering of capturing of files for either the start of the process illustrated in FIG. 1 or the maintenance of files illustrated in FIG. 2.

Figure 6:
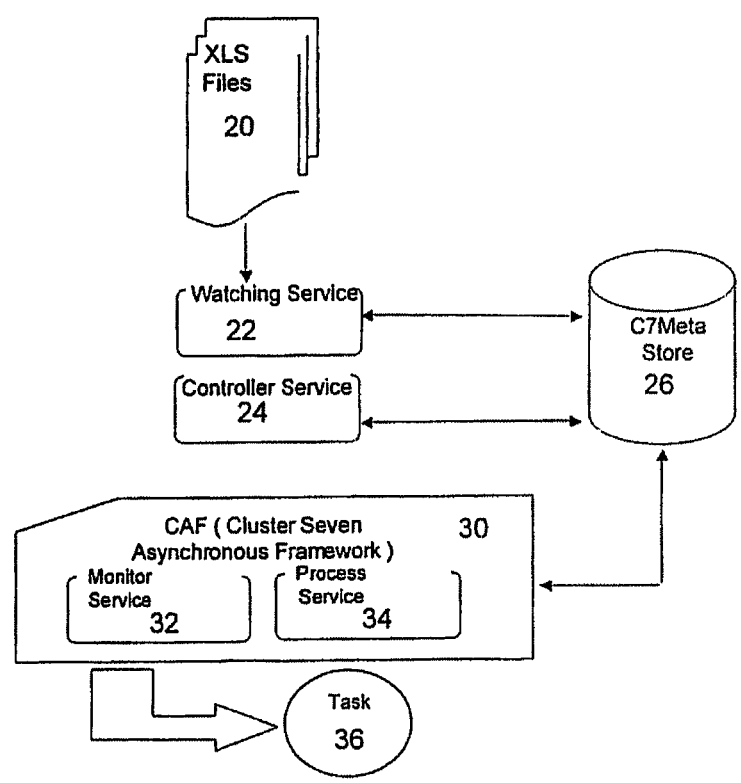
FIG. 6 is a block diagram that shows the principal functional components of an embodiment of the invention.

FIG. 6 is a block diagram that shows the principal functional components of an embodiment of the invention. The entirety of spreadsheets 20 stored within a file store are accessed by a watching service 22. A Controlling service 24 is also provided. The watching service and controller service communicate with a meta-store 26. The meta-store 26 also communicates with an asynchronous framework comprising a monitoring service 32 and process service 34. The functional components of FIG. 6 are described in greater detail below.

Figure 7:
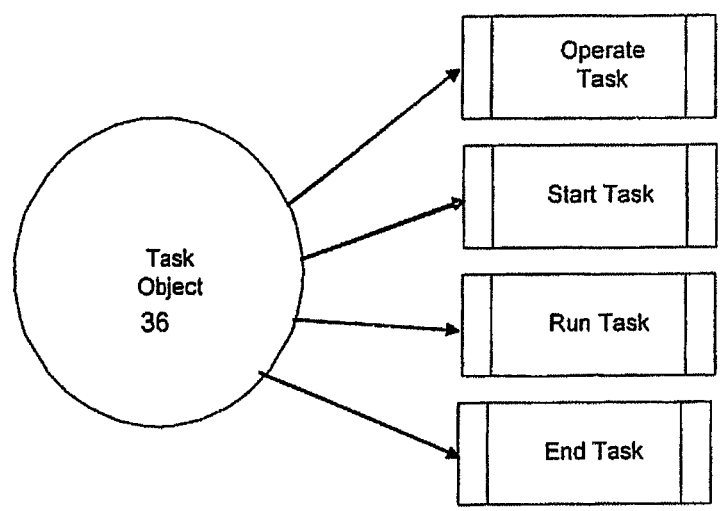
FIG. 7 is a diagram illustrating a base class from which other task classes are derived.
Figure 8:
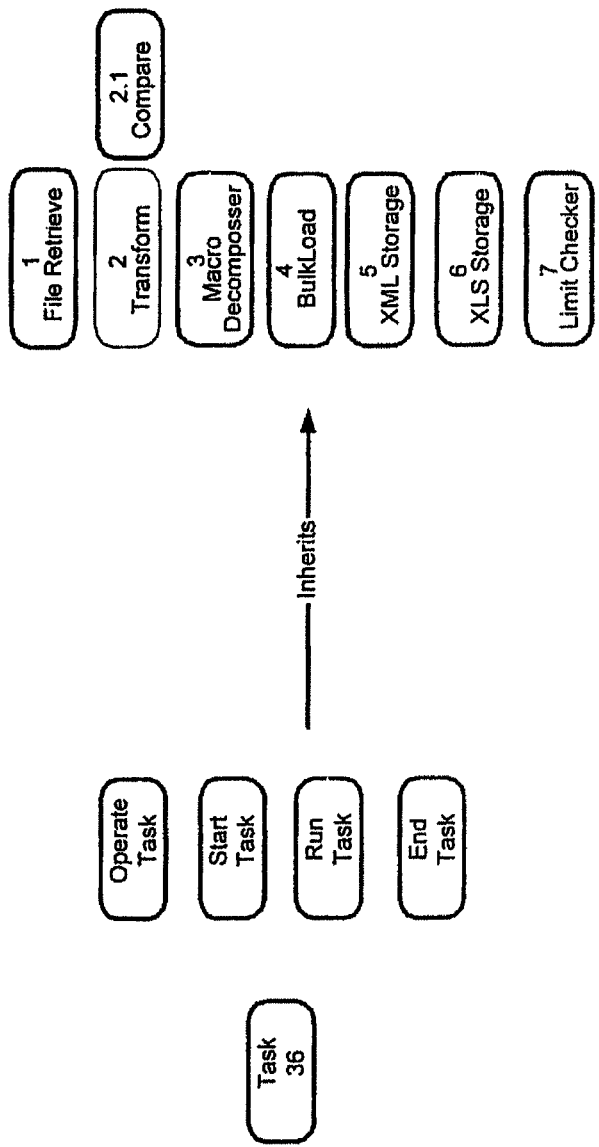
FIG. 8 is a diagram illustrating various task classes.

The tasks associated with the asynchronous framework 30 may be implemented by a task object 36, illustrated in greater detail in FIG. 7. As illustrated in FIG. 7, each task object exposes various methods, including an operate task, start task, run task and end task. The functional components of FIG. 6 and the methods of FIG. 7 are described in greater detail below. As illustrated in FIG. 8 the task object 36 and the exposed methods inherit various classes derived from the task object 36 which perform various processes in the system. These include a file retrieve object, a transform object, a macro decomposer object, a bulkload object, an XML storage object, an XLS storage object and a limit checker object. The transform class calls a compare class and the macro class. The methods of FIG. 7 and the classes of FIG. 8 are described in greater detail below.

FIGS. 9 to 15 illustrates the operation of the various classes of FIG. 8. In each case, the asynchronous frame launches the object using the operate task method, receiving a transaction state object (TSO) as an input containing the state variables for a task to use within its processing. The operate task method also calls a log tracing call function making a log entry into tracing code. A validate state operation is also performed. The start task method sets up running configuration variables in the set startup variables operation The variables are stored in the metastore (also referred to herein as a database) 26. The run task method performs all the functions for completing the task. On completion of the task, the end task method sets all finishing operations including setting the completion status in the metastore 26.

Figure 9:
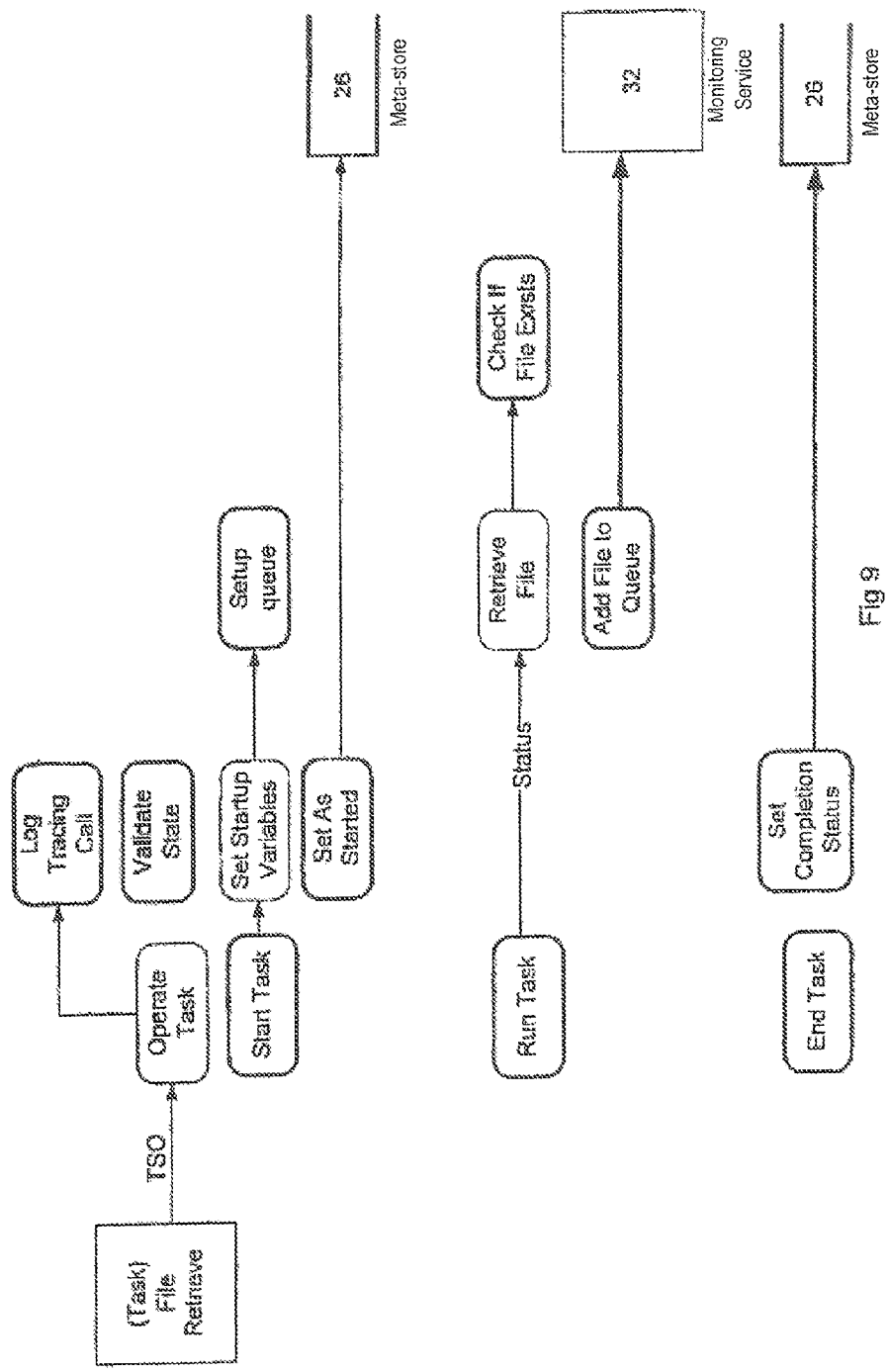
FIG. 9 is a diagram illustrating the operation of the file retrieve class.

As illustrated in FIG. 9, the file retrieve class run task method includes the functions for retrieving a file, for checking if a file exists, and adding a file to the file processing queue in the monitoring service 32.

Figure 10:
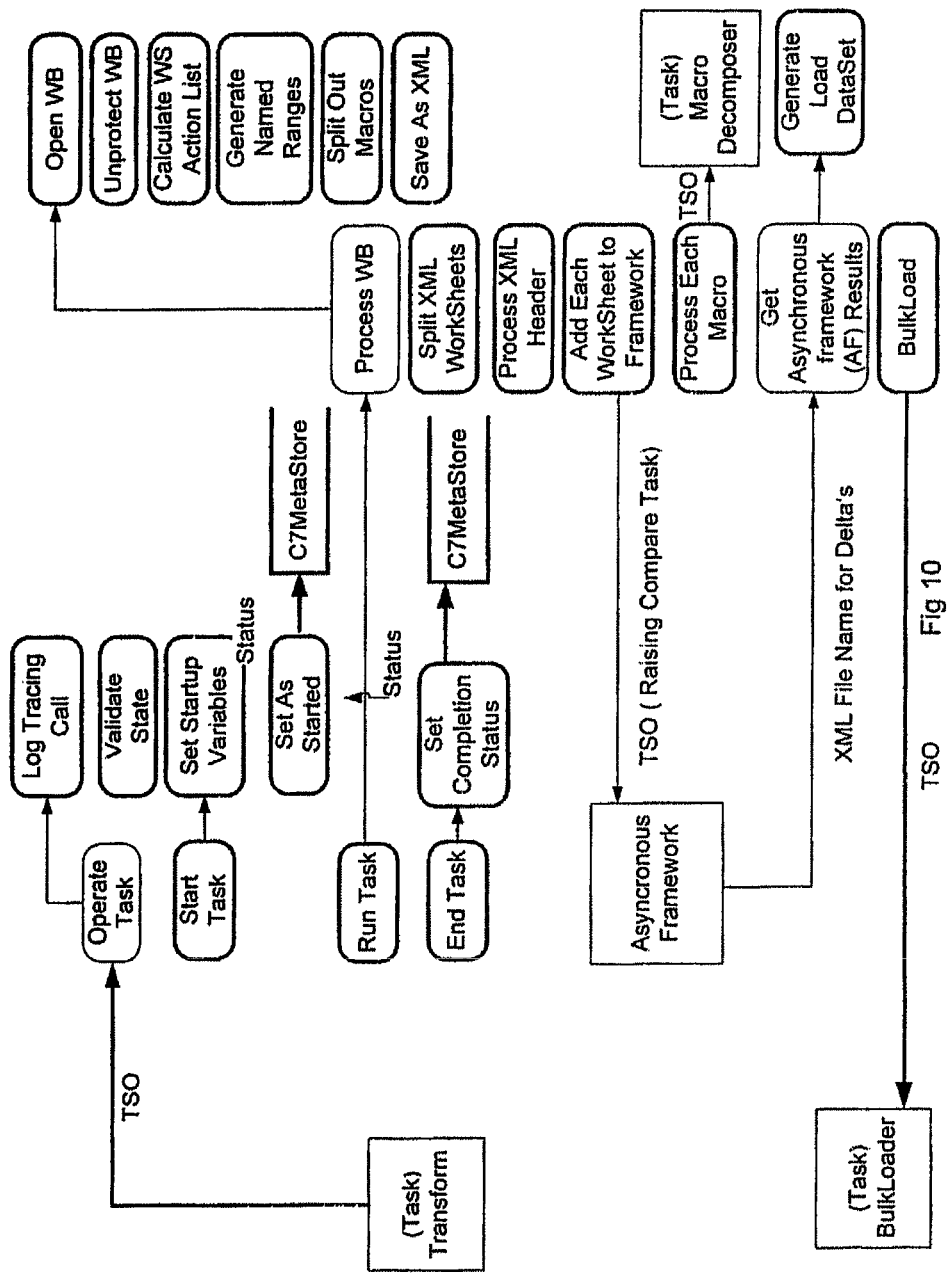
FIG. 10 is a diagram illustrating the operation of the transform class.

As illustrated in FIG. 10, the transform class run task method includes a function for processing a workbook (WB). This includes functions for opening the workbook, unprotecting the workbook, calculating a worksheet (WS)

action list, generating named ranges in the workbook, splitting out macros in the workbook and saving the workbook as an XML file. The run task method also includes functions for splitting XML worksheets, processing an XML header and adding each worksheet to the framework. In this last function, a transaction state object raising a compare task for comparing a spreadsheet at different time points is issued to the asynchronous framework. In a function for getting the asynchronous framework results, the result of the comparison task including the XML file name for the 'delta' representing the changes in the spreadsheet is returned from the asynchronous framework. Each macro is processed by issuing a transaction state object to the macro decomposer class and a bulk load is performed by issuing a transaction state object to the bulk loader class.

Figure 11:
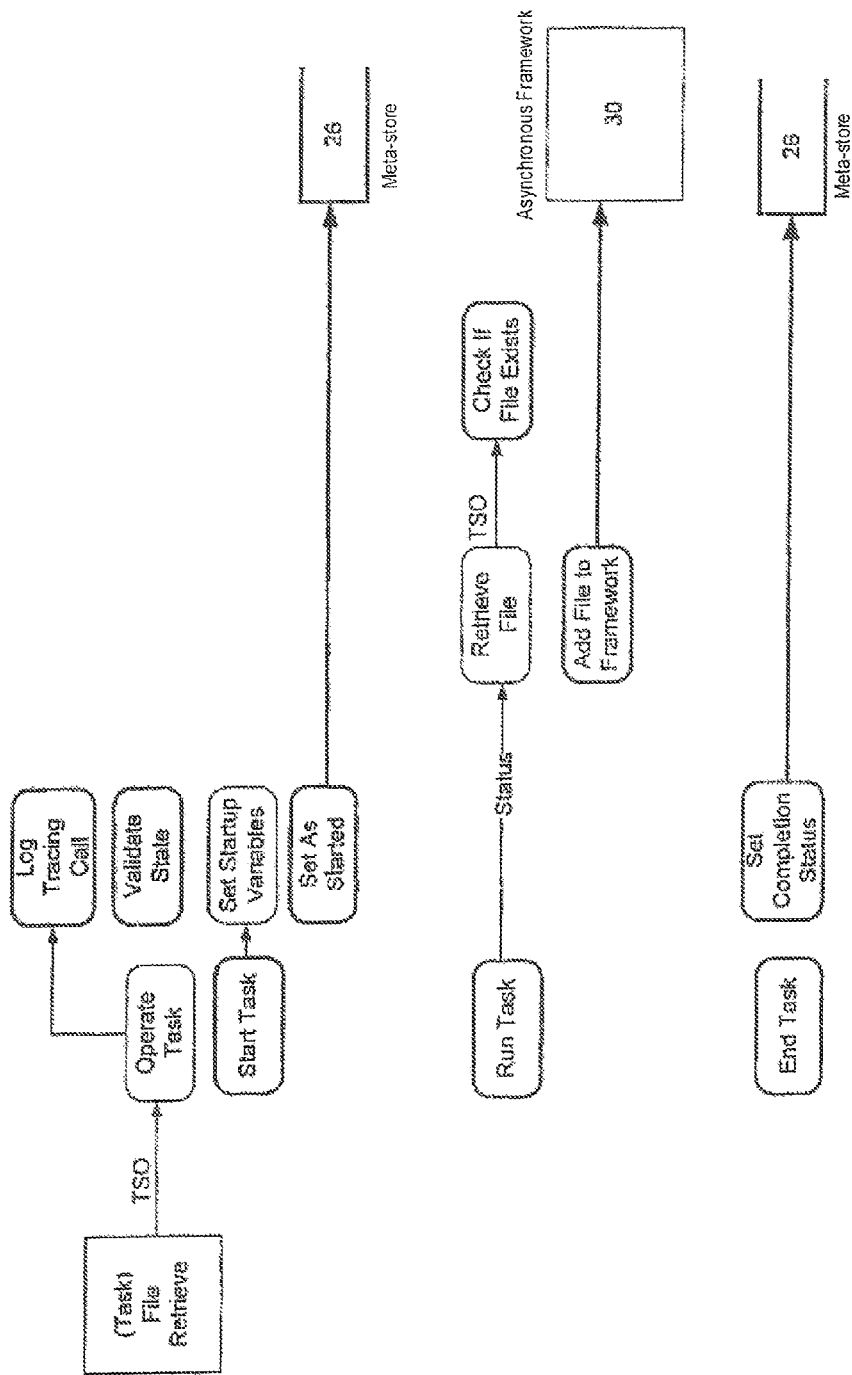
FIG. 11 is a diagram illustrating the operation of the file retrieve class.

As illustrated in FIG. 11, the file retrieve class run task method includes functions for retrieving a file, checking if a file exists (via a transaction state object) and adding a file to the asynchronous framework 30.

Figure 12:
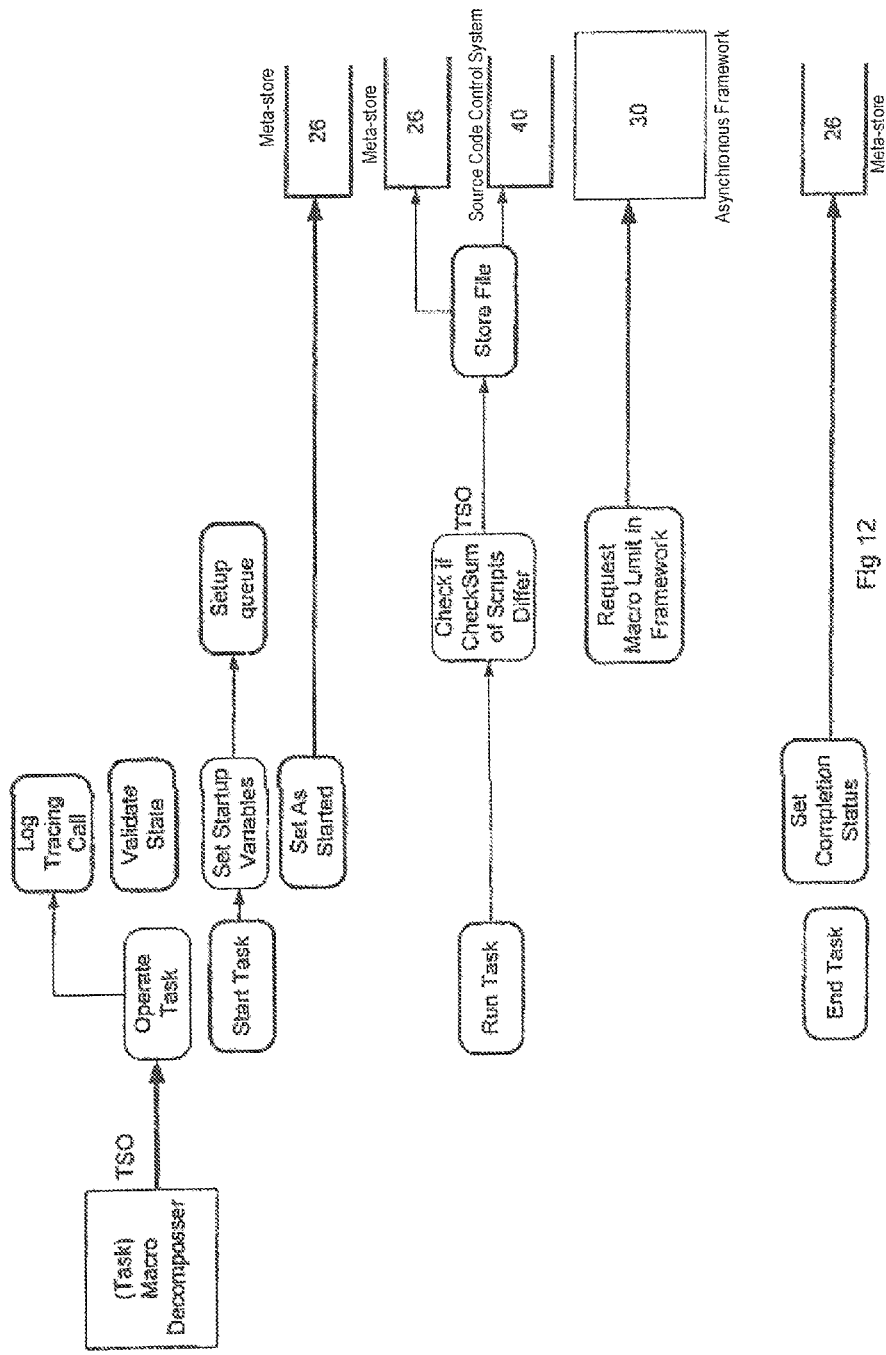
FIG. 12 is a diagram illustrating the operation of the macro decomposer class.

As illustrated in FIG. 12, the macro decomposer run task method includes a function for checking if the checksum of scripts differ. A transaction state object is issued by this function for storing a file in the metastore 26 and source code control system 40. A function is provided for requesting a macro limit in the asynchronous framework.

Figure 13:
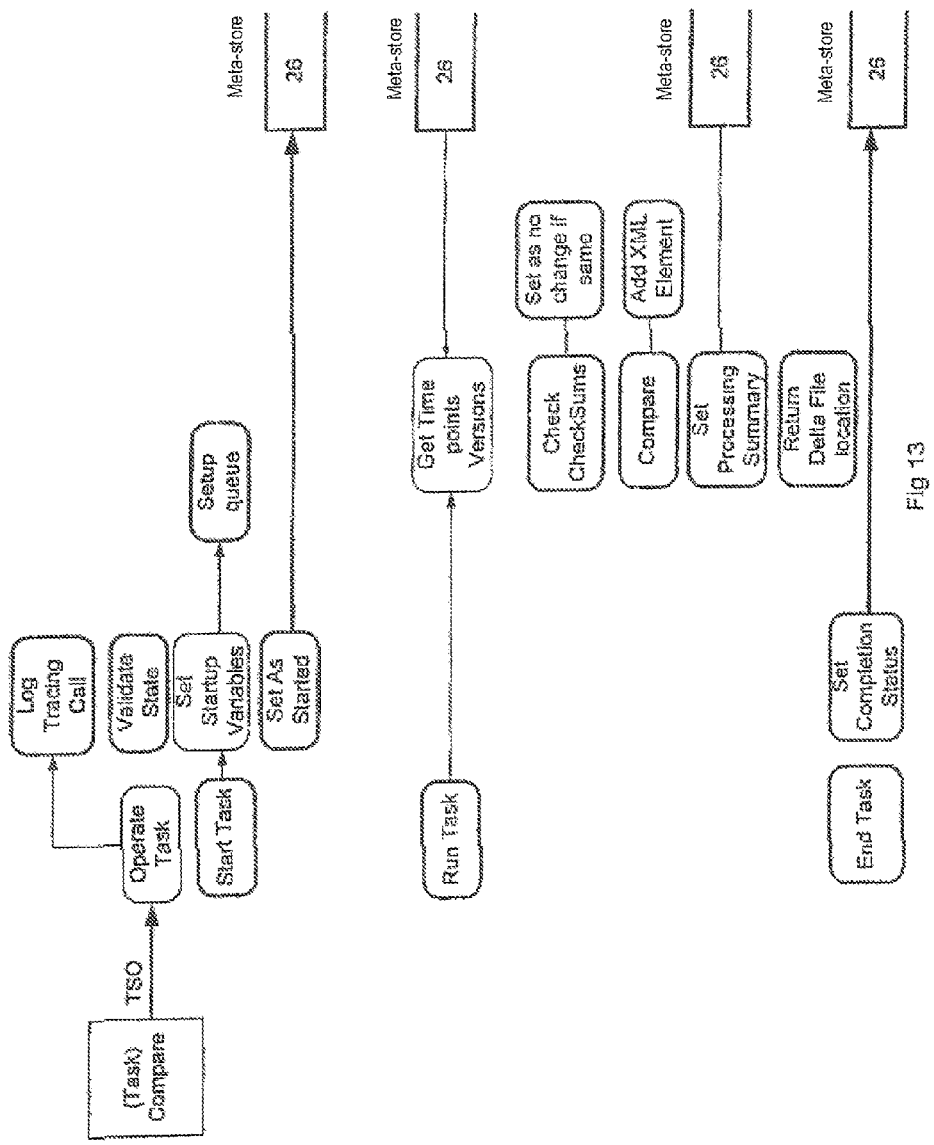
FIG. 13 is a diagram illustrating the operation of the compare class.

As illustrated in FIG. 13, the compare class run task method includes a function for getting time points versions of a worksheet from the metastore 26. Functions are also provided which check checksums, compare worksheets, set a processing summary and return the location of the delta file resulting from the comparison.

Figure 14:
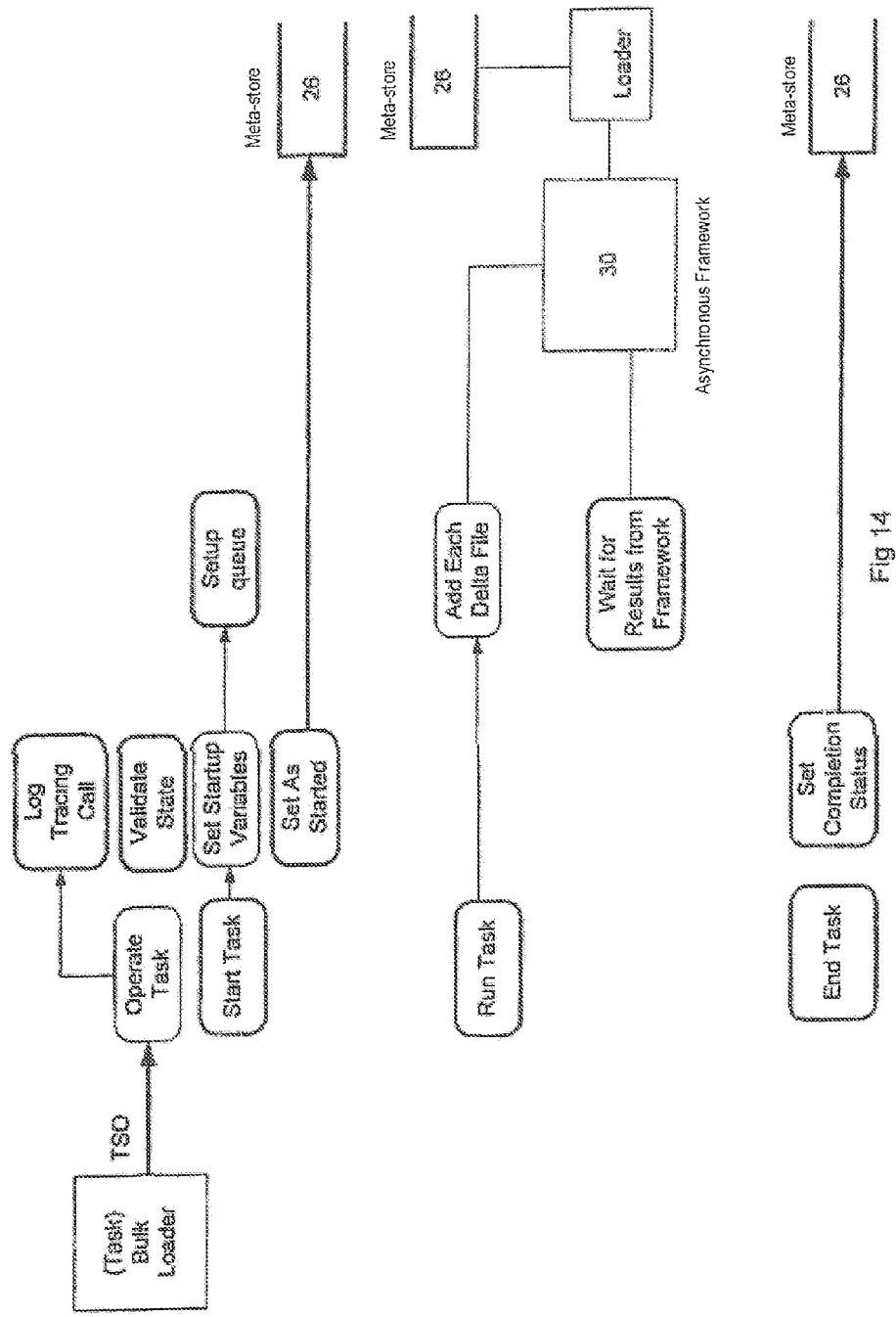
FIG. 14 is a diagram illustrating the operation of the bulk load class.

As illustrated in FIG. 14, the bulk loader class run task method includes a function for adding each delta file generated from spreadsheet comparisons to the asynchronous framework 30. A loader function provides the data to the metastore 26. One function waits for results from the asynchronous framework.

Figure 15:
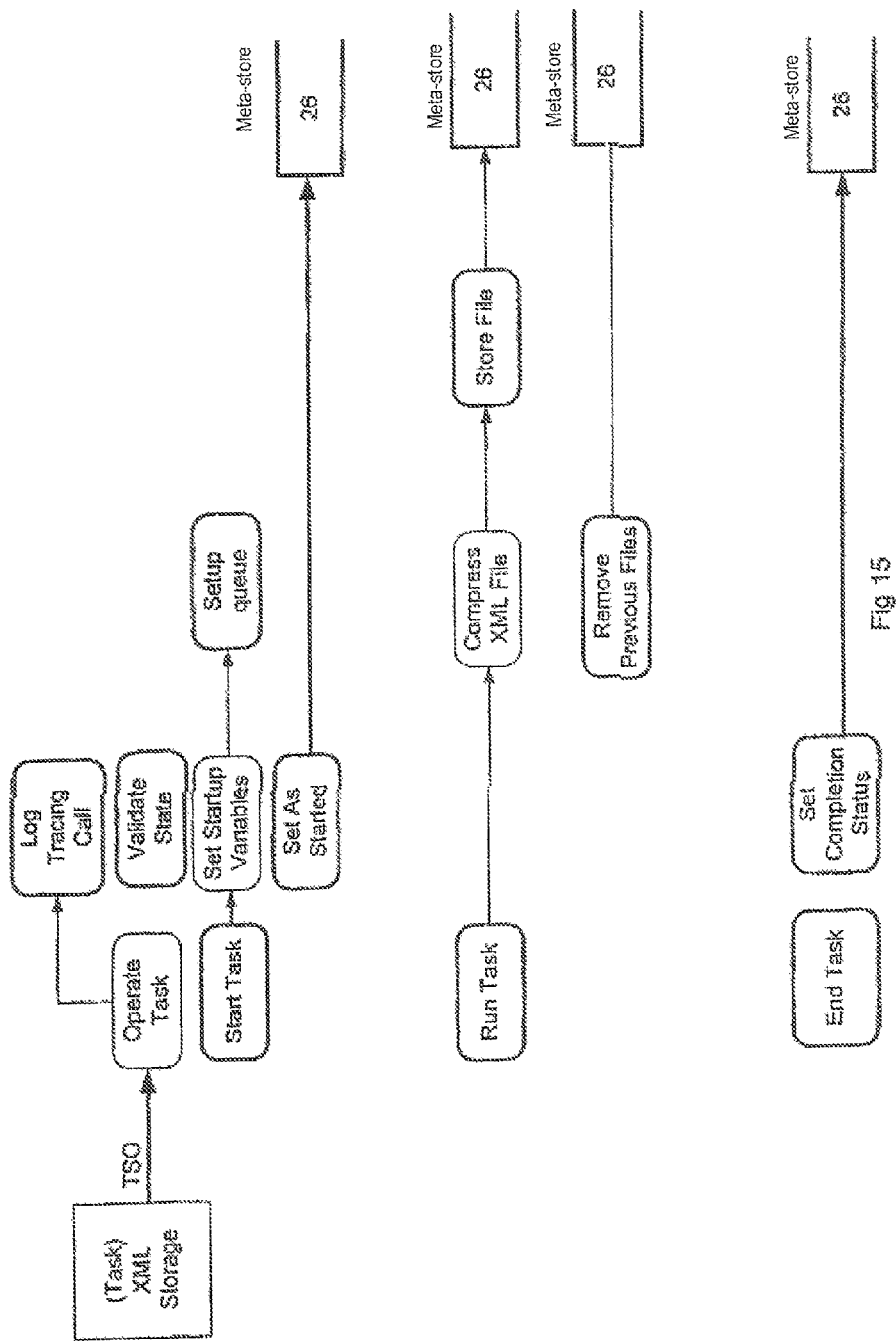
FIG. 15 is a diagram illustrating the operation of the XML storage class.

As illustrated in FIG. 15, the XML storage class run task method includes a function for compressing an XML file. The compressed XML file is stored in the metastore 26 by a store file function. A function for removing previous files from the metastore is also performed.

The Embodiment in Greater Detail

This embodiment of the invention is implemented within a network of computers. In this network there is an arbitrarily large number of clients, which are personal computers upon which users run spreadsheet applications to develop and use spreadsheets. Users may also store their personal spreadsheet files upon these computers. Files can be monitored on any drive linked to the network. Usually, but not always, important spreadsheets are located on central file servers. Also on the network is a monitoring server, which is responsible for monitoring and recording activities performed by users upon the spreadsheets.

Figure 5:
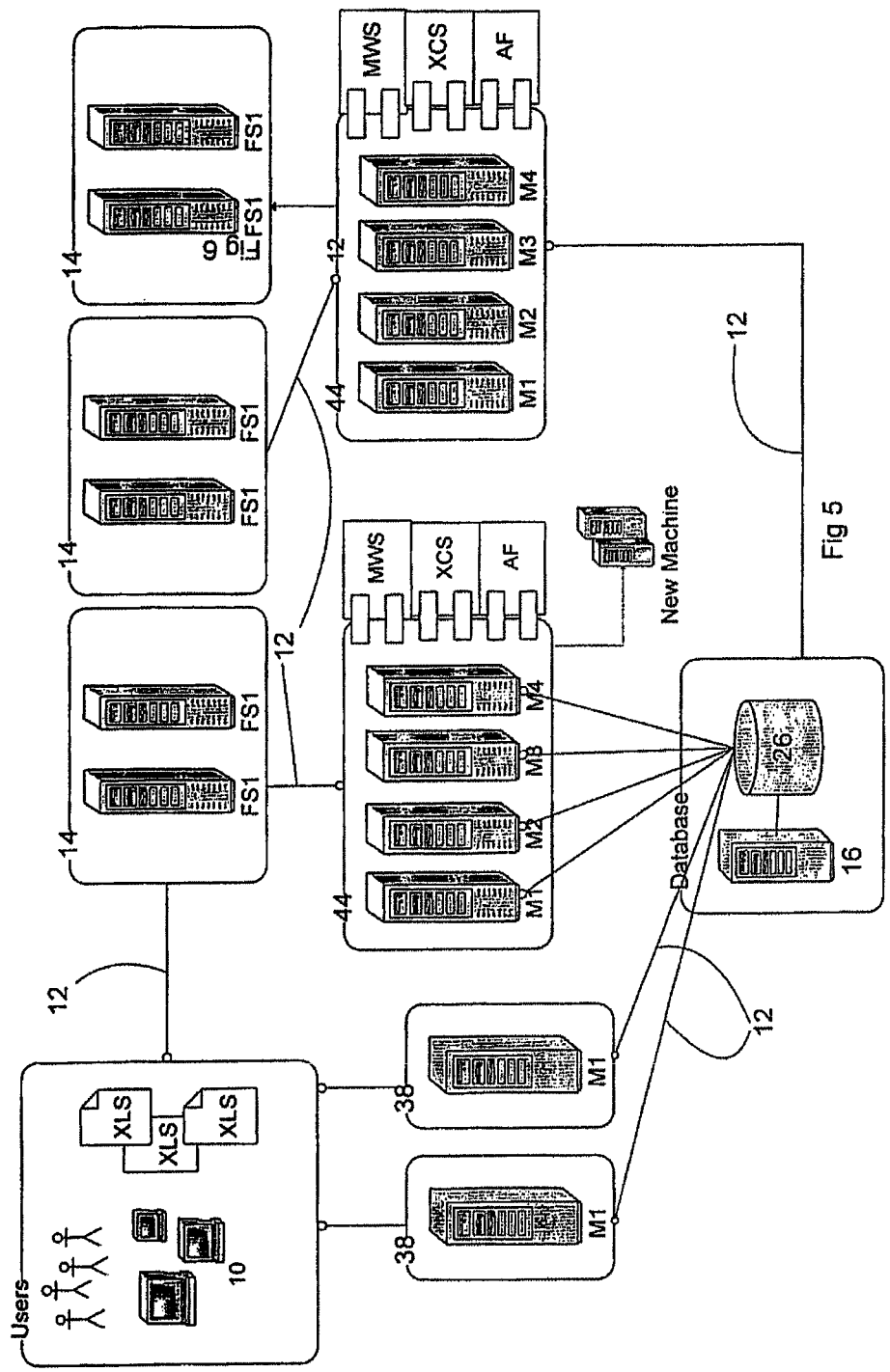
FIG. 5 is an overview of a network of computers within an enterprise in which the present invention is embodied.

As shown in FIG. 5, a network of computers within an enterprise comprises an arbitrarily large number of client computers 10. Each client computer 10 is used by a user to create personal documents, including spreadsheets. Typically, each client computer 10 has a single user who will have their own personal preferences and working practices associated with their spreadsheets.

Each client computer 10 is connected to a network 12. For the purposes of illustration, this is shown in FIG. 1 as an integrated network. However, in practical embodiments, it is likely to include many subnets, and local-area and wide-area network links.

Also connected to the network 12 is one or more file servers 14. Depending on network policies, a user may choose to store files either on their client machine 10 or on a file server 14. Together, local storage provided by each client computer 10 and file servers 14 constitute a diverse file store.

A monitoring server 16 is connected to the network 12 such that it has access to the entire file store, or to part of the file store, according to the policy of its operator. It is within the monitoring server 16 that the processes provided by the invention are performed. The configuration of the monitoring server 16 is highly dependent upon the nature of the network as a whole. The monitoring server 16 must be capable of performing its task with minimal delay upon operation of software executed on the clients 10. In some cases, the monitoring server 16 may be a monolithic machine while in other cases it may be a cluster of machines controlled by servers 44 to enable parallel processing of multiple documents. These will now be described in greater detail.

In FIG. 6, the entirety of spreadsheet files within the file store is shown at 20. The other items shown in FIG. 6 are logical components of the monitoring server 16. These components are as follows: a watching service 22, a controller service 24, a metastore database 26, and an asynchronous framework 30 that includes a monitoring service 32 and a process service 34. Operation of the system as whole is controlled by passing task messages between the various logical components. This has the advantage that it enables the system to be scaled by adding further machines into a cluster and distributing task messages amongst them. It also allows the monitoring server to process the spreadsheet files 20 asynchronously of the clients, thereby ensuring a minimum of interference with the operation of their users' spreadsheet programs.

The function of the watching service 22 is to monitor the spreadsheet files 20 and to raise an event when any of them changes. Upon detection of a change, the file is read, its current contents compared with the contents of the file when it was last read, and changes which are identified are then stored in a database. Thus, every time the file in the file store changes a record is made. It is therefore possible, starting with the file as it is in the file store, to apply the recorded changes in reverse and thereby arrive at the file as it was at an earlier stage in its development. Provision of the watching service 22 obviates the need to provide hooks into the spreadsheet programs to trigger an action upon a file being changed.

In general, this embodiment is concerned with processing spreadsheets created using Microsoft Excel. This application stores spreadsheets in files that conventionally have a filename extension ".XLS" (conveniently referred to as "XLS files"). These are binary files. However, the principles of the invention could equally well be applied to spreadsheets created using other applications irrespective of how these applications store spreadsheet data. Since it is notoriously difficult to perform content analysis on binary files, the approach taken by this embodiment is to first convert XLS files into a representation in the Extensible Markup Language (XML). Other spreadsheet programs, notably OpenOffice.org Calc use XML as their native file format. Therefore, the conversion step can be omitted when processing these files.

As has previously been discussed, this embodiment is implemented on a cluster of computers. Operations performed by the server are carried out as discrete tasks. Task objects are created and are placed in a task queue. When a task reaches the head of the queue, it is processed by the first available machine in the cluster. FIG. 7 illustrates the structure of the parent class from which all tasks are derived. Four main methods are exposed by every task object. These are: Operate Task, Start Task, Run Task and End Task. Operate Task is the method for the asynchronous framework to launch the object. It also makes a log entry into tracing code. It takes as an input a Transaction State Object (TSO) which contains the state variables for a task to use within its processing. The Start Task method sets up running configuration variables. Run Task performs all functions for completing the task. End Task sets all finishing operations.

The principal classes derived from that class illustrated in FIG. 7 are themselves illustrated in FIG. 8. These include task objects to retrieve a file from the file store, transform and compare the file contents, process macros, handle storage within the database, and handling change information. These classes will now be described briefly.

File Retrieve: this class is responsible for copying the file from the targeted changed location.

Transform: this class is responsible for taking an XLS file and deconstructing the file into XML worksheets. The Transform class calls the Comparison class and Macro class to perform all delta operations. This class will deconstruct all named ranges and detect any changes. This class also spawns the Compare and Macro Decomposer tasks into the asynchronous framework.

Compare: this class is responsible for calculating and classifying the state at the most recent time point and a description of the changes, known as "deltas" between two time points of the XML. This class classifies all change types and cell types and tags each delta change with the associated change. This class uses the following algorithm:

Position the pointer at the first cell from the previous XML file and current file XML file.

Compare the cell matrix positions (row position, column position) of the two cells. If the current and previous cell positions are the same, then compare the cell values and formulas to check for differences. The comparison will identify and classify the type of change. If the cell contains a formula the cell is tagged with the type of "formula" to distinguish clearly between a cell that contains a fixed numerical value and one that, when displayed, shows the same value as a result of a formula evaluation. The difference between the cell changes is also established. For an integer value the difference is between the two integers. A string difference is based on the length of each string. A date difference is calculated by the number of days. If the current cell position is greater than the previous cell position, then add a "data added" record to the delta XML file. If the previous cell position is greater than the current cell position, then add a "data deleted" record to the delta XML file.

Get the next cell from the file where the cell matrix position is the smallest and start the comparison process again by comparing the cell matrix positions.

Repeat this process until both the previous and current XML file have been read until the end of the file.

The completed process results in a delta XML file. This contains the categorised differences between the current and previous time points.

Bulk Load: this class is responsible for bulk inserting the delta file created from the Transform/Compare task.

XML Storage: this class is responsible for storing the XML file created from the transformation of the document. This class serves to compress the current generated XML file, remove the previous file and upload the new file to the file store.

Macro Decomposer: this class calculates the differences between two programmatic scripts at two time points. The capture script may be integrated into an existing source code control system 40.

Limit Checker: this class monitors change types occurring within the database and provides alerts to the specified targets.

One exemplary embodiment provides a Web-based interface through which a user can gain access to data within the database, this provides a central point from which all spreadsheet activity can be monitored. A process running on the monitoring server 16 generates queries that are applied to the database and from the results of those queries generates pages that can be served to a Web browser by a Web server 38. The range of queries and reports that can be generated is essentially without limit. These are tailored to the specific requirements of a particular user of the system. The same interface can also be used for configuration and maintenance of the system. Provision of a Web-based interface to a database is a routine matter and the details will not therefore be described here further.

Additionally, it is possible to generate alerts based on the result of the queries. For example, an administrator may define a range of prohibited actions for some parts of a specific spreadsheet, or may wish to be alerted when the value of a particular cell moves outside of a predetermined range. The system may generate and dispatch an e-mail message to a predetermined address when it detects that an alert should be issued.

Several of the main screens provided by other Web-based interface will now be described briefly.

Figure 16:
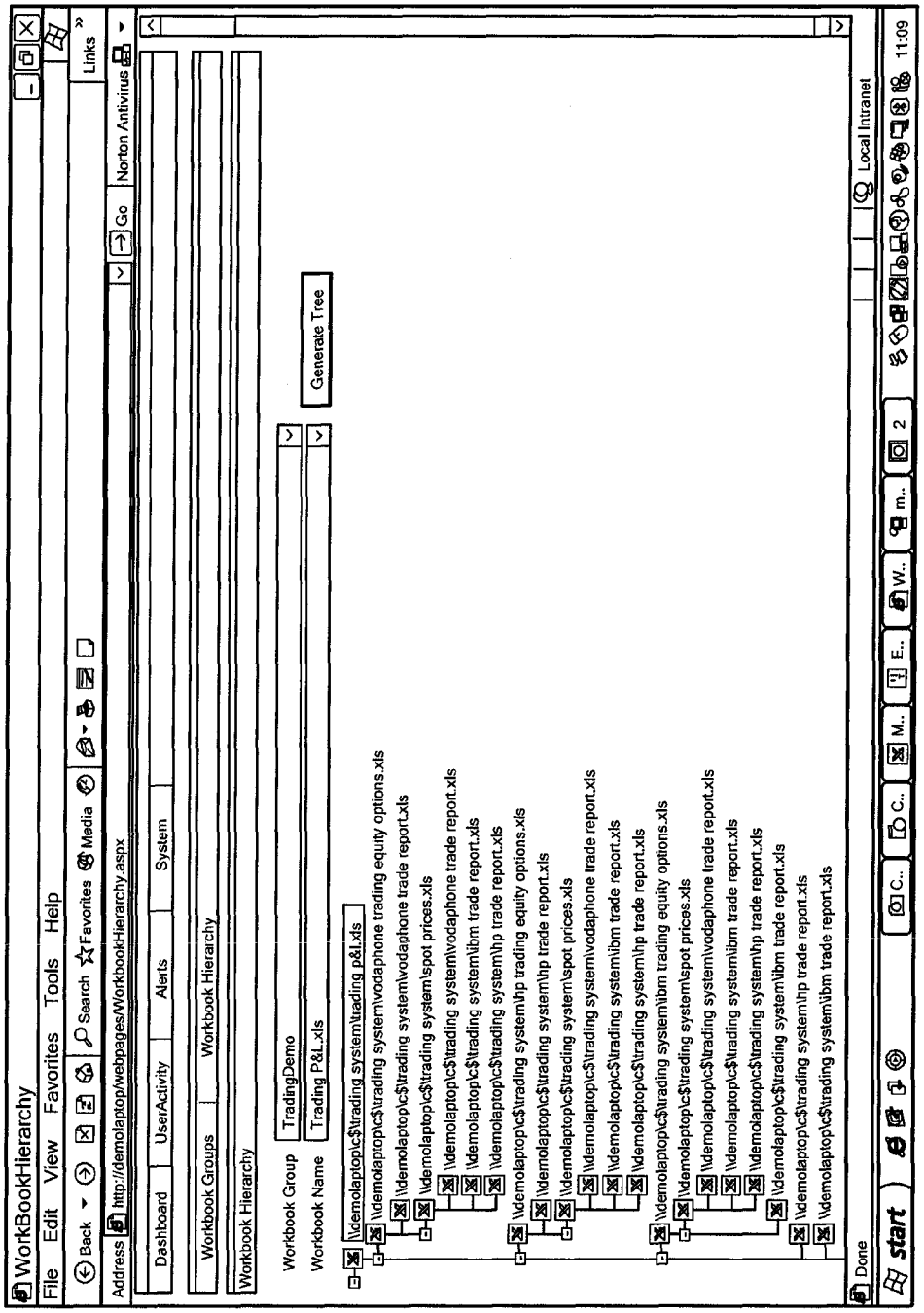

FIG. 16 is a screen that allows a user to see which files are being monitored and, where files are linked, the hierarchy of linked files.

Figure 17:
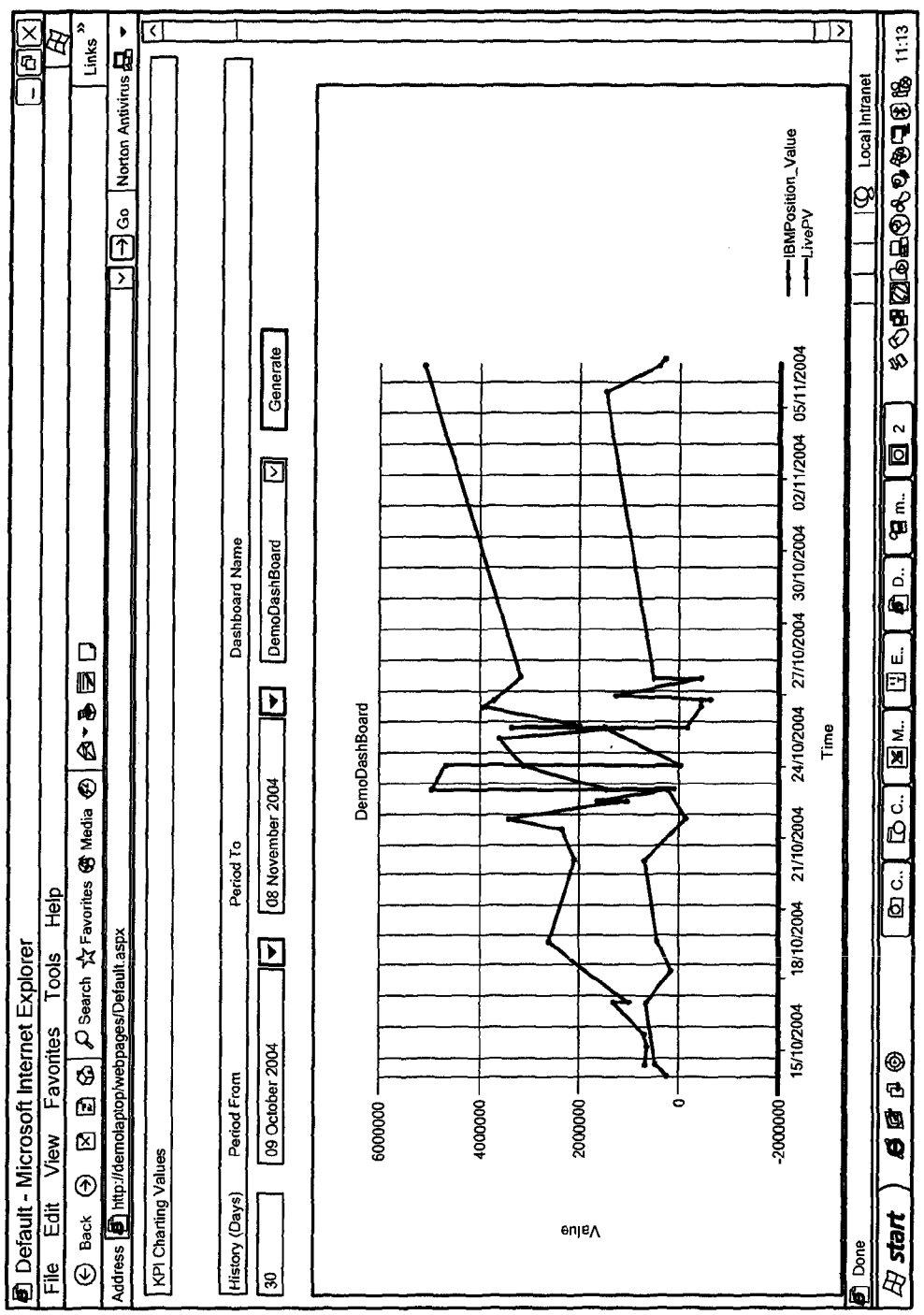

FIG. 17 shows a screen that allows the user to monitor how the value of a particular cell within a spreadsheet changes over time. Value is represented graphically in this screen.

Figure 18:
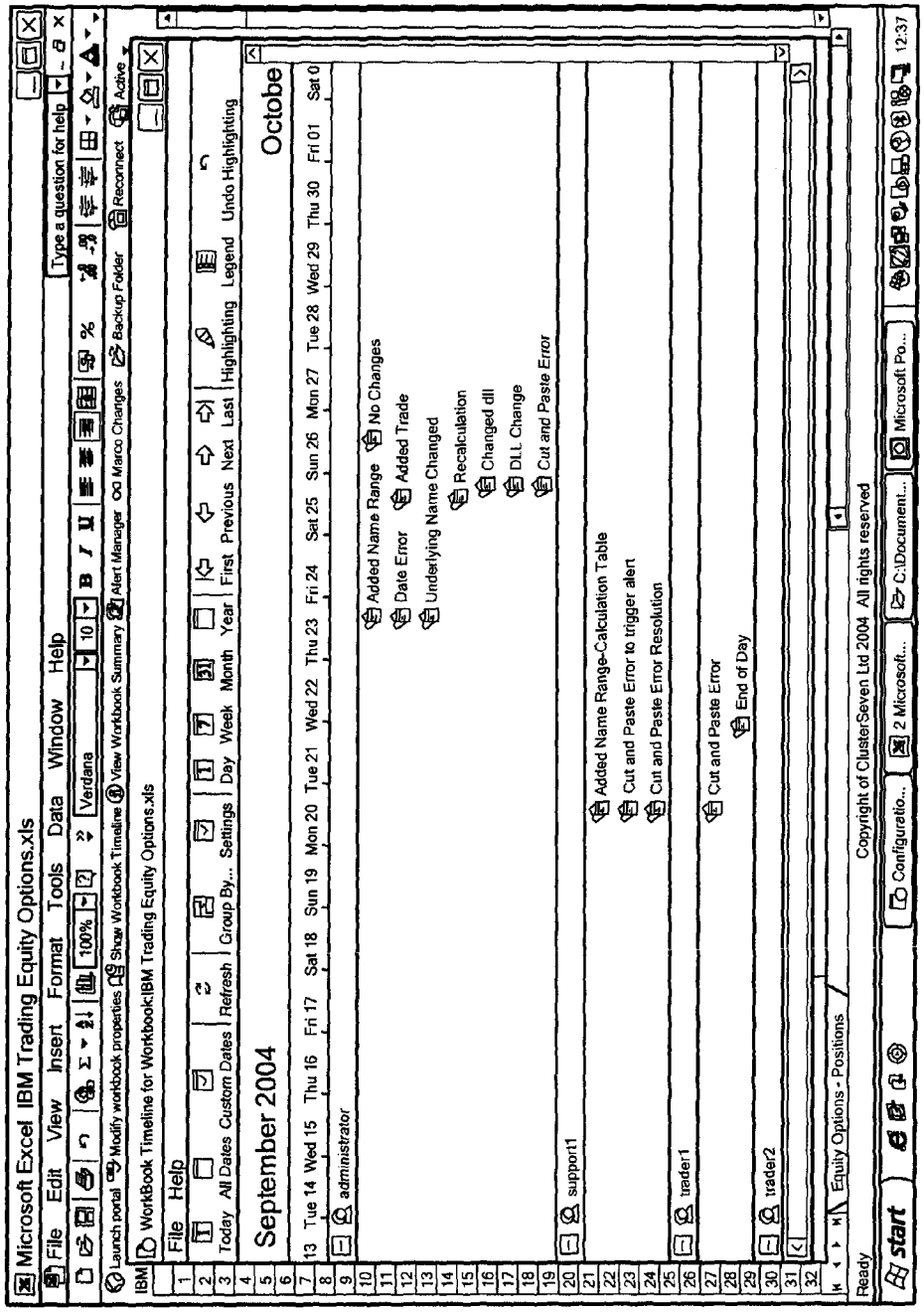

FIG. 18 shows a screen that presents a user with a summary of changes that have been made to the spreadsheet or over time. The nature of each change and the person who made it are identified.

FIG. 19 illustrates the source code control aspect of the invention. In FIG. 19, the right-hand pane shows a segment of program code in its current version, while the left-hand pane shows the previous version of the code.

Row or Column Insertion, Deletion and Shifting

As described above, in a typical embodiment, the comparison means is operative to compare a current file in the file store with a previous version of that file. Each cell in the current file is compared with the corresponding cell in the previous version so that changes in the spreadsheet may be recorded on a cell-by-cell basis. However, various common actions in spreadsheet editing cause large numbers of entities (such as values and formulas) to shift position within the spreadsheet. For example, when a row is inserted or deleted, this action causes all of the values and formulas below the inserted or deleted row to shift up or down by one cell. Similarly, inserting or deleting a column causes all the values and formulas in cells to the right of the inserted or deleted column to shift left or right by one cell. In another example, sorting values by rows or columns cause values in rows or columns to be re-ordered and shift by varying amounts.

With these types of actions, analysing the differences between a current and previous version of a spreadsheet on a cell-by-cell basis results in a large degree of noise resulting from the shifting of sometimes large numbers of entities. A typical delta file resulting from the comparison would indicate many changes as changes of value in particular cells whereas it would be more appropriate to recognise these changes as resulting from the shifting of entities. It is preferable therefore, when analysing changes in a spreadsheet, to highlight the fact that some change have occurred due to shifting entities caused by a single action. This allows the noise in the spreadsheet changes to be filtered out.

Figure 21:
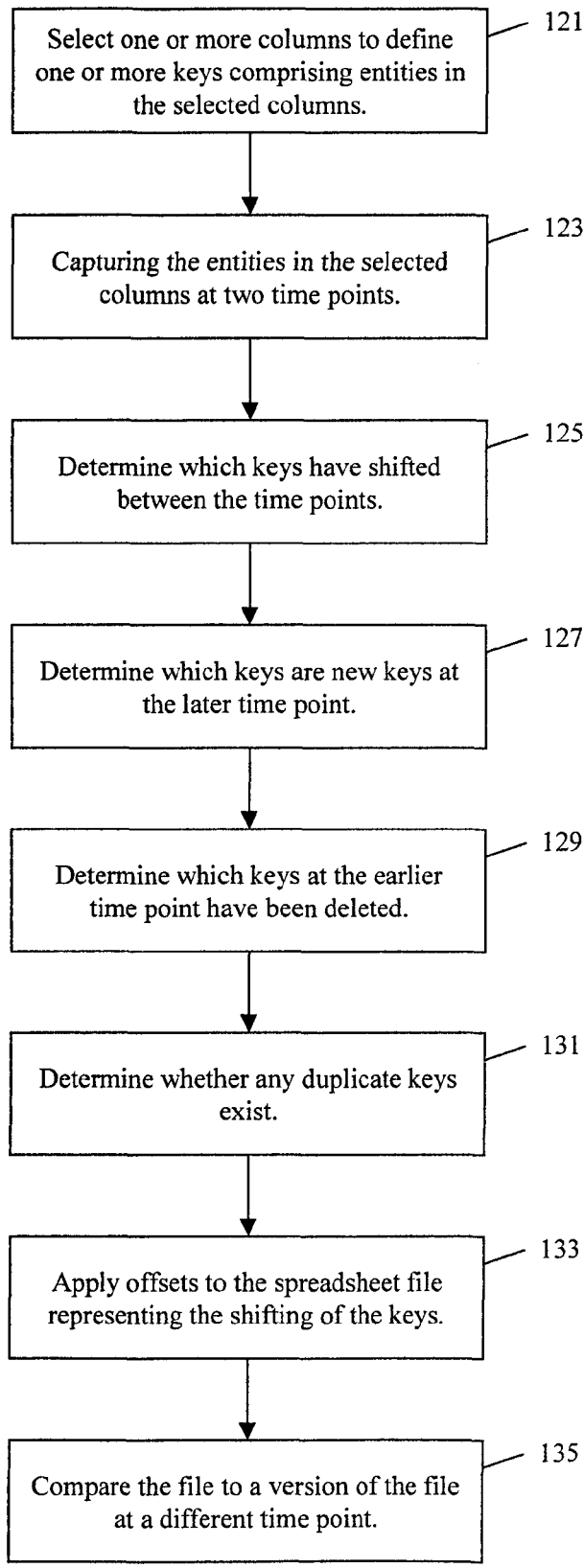
FIG. 21 is a flow diagram of a method used to take into account row and column insertion and deletion processing and data sorting processing when tracking changes in a spreadsheet.

In order to determine whether changes in multiple cells have arisen due to a single action, while retaining the cell-by-cell comparison scheme, the following method may be employed, with reference to the flow chart of FIG. 21. First, the movements of a sample of entities in the spreadsheet are tracked to determine the movement of entities in general in the spreadsheet. Then, prior to comparison of two version of a spreadsheet, the determined movement of the entities is applied to the earlier version of the spreadsheet before a cell-by-cell comparison between the two versions of the spreadsheet is applied. In the preferred embodiment, the sample of entities whose movement are tracked are formed of the entities in one or more rows and/or one or more columns. These entities may be referred to as 'keys'. Determining the position of each key in the two versions of the spreadsheet allows the movement of each key between the two versions to be determined.

As will become apparent, one or mores columns may be selected to detect movement of entities caused by the insertion or deletion of rows or sorting of cells in the vertical direction. One or more rows may be selected to detect insertion or deletion of columns or sorting of cells in the horizontal direction. In the example described below, one or more columns are selected. However, the corresponding process with respect to rows may easily be applied as an alternative, or in combination with column selection. In a first step 121 of the exemplary method, one or more columns are selected to define one or more keys comprising entities in the selected columns.

Preferably, a column is selected such that each key thereby obtained is a unique entity, such as a unique value. The reason for this is to facilitate tracking the movement of particular keys. If two keys were the same then it would not be possible to determine with certainty which of the two keys in one version of the spreadsheet corresponds to a specific one of the keys in an earlier version of the spreadsheet. The movement of such duplicated keys could not therefore be determined with certainty. In many spreadsheets, one or more columns do contain values which are all different from one another. However, if there is no column in which each of the entities is unique, a combination of two or more columns may be used to define a set of unique keys. For example, the entities in a particular row of two or more columns may be concatenated to form a single key. This process is repeated for each of the other rows to form the set of keys. It can be seen that this process will generate a unique set of keys if a set of columns is chosen such that the entities in any row of the columns form a set which is different from the entities in any other row of the columns.

The selection of one or more columns to define a set of keys may be performed using an entity selector either automatically by the system or manually by a user. For example, in the case of manual selection, the system is configured to allow the user to highlight one or more columns, thereby selecting the entities in those columns as keys. In the preferred embodiment the system provides a range manager screen whereby a user can select the named range they are interested in and then choose the column, or combination of columns, that defines uniqueness for the entities within the named range. In the case of automatic selection, the system may be configured to select the most appropriate columns based on the particular spreadsheet being analysed.

The selection of the keys is performed initially once it is determined that it is desired to track the change in a particular spreadsheet. The subsequent processing to track the changes in the spreadsheet will now be described.

During processing of the spreadsheet by the system, at each time-point, the entities in the selected column or columns are captured and stored in a database. As illustrated in FIG. 21, in a next step 123, the entities in the selected columns at two time points are captured. This step provides information as to the location of each key at different time points.

To track spreadsheet changes between two time points, the system is arranged to determine the movement of each key between the time-points using a tracker. In a next step 125, the system determines which keys have shifted between the time points. To achieve this, the captured data for the first time point is searched for each key and the row position of each key at the first time point is determined. The captured data for the second time point is searched for each key and the row position of each key at the second time point is determined. The row position of each key at the first time point is subtracted from the row position of each corresponding key at the second time point by an offset determinator to define a value or offset representing the number of rows each key has shifted between the two time points. The movement of these key can be categorised as 'stationary' if a key has not shifted, or 'non-stationary' if a key has shifted.

The information representing the movement of keys between two particular time points may be stored in the database. A database entry for each key is created and placed in one of several different buckets, each bucket corresponding to one of the possible types of movement of the keys. For example, an entry for each stationary key is placed in a 'stationary' bucket, while an entry for each non-stationary key is placed in a 'non-stationary' bucket. Each of these entries may contain the current row the key is on and the previous row the key was on.

When a row has been inserted or deleted between two time points, the entities on the inserted or deleted row exist at one time point but do not exist at the other time point. For example, when a row is inserted, new entities are created on the inserted row which exist at the later time point but which do not exist at the earlier time point. Similarly, when a row is deleted, entities on the deleted row exist at the earlier time point but do not exist at the later time point. These processes cause the deletion of existing keys and the creation of new keys in the selected columns.

In a next step 127, an entity creation determinator of the system determines which keys are new keys at the later time point. In a further step 129, an entity deletion determinator of the system determines which keys at the earlier time point have been deleted. The system is configured to analyse the information stored in the database to determine whether any entities existing at the earlier time point do not exist at the later time point. Such entities may be categorised as 'deleted'. The system is also configured to determine whether there are any new entities at the later time point which do not exist at the earlier time point. Such entities may be categorised as 'new'. A database entry for each deleted entity may be created and placed in a 'deleted' bucket while a database entry for each new entity may be created and placed in a 'new' bucket. Each entry may contain the row the entry is, or was, on at the relevant time point.

The system is also arranged to analyse the information stored in the database to determine if any keys at either of the two time points are the same. This may occur for example if the original keys selected were not all unique, if the entities in the selected columns are modified or if a new non-unique key is created. Where a key is not unique, the key may be categorised as 'duplicate'. In a next step 131, an entity duplication determinator of the system determines whether any duplicate keys exist. A database entry for each duplicate key may be created and placed in a 'duplicate' bucket.

Once the movement of each key between the time points have been placed in the relevant buckets, a cell-by-cell comparison of the spreadsheets at the two time points can be made as described above, but modified to take into account the shifting of entities. This removes the effect of noise caused by actions such as insertion and deletion of rows, and sorting operations In processes such as row insertion and deletion and sorting in the vertical direction, the entities within each column shift by the same amount. For example, in a row insert operation, all of the entities occurring above the inserted row do not shift, and all of the entities occurring below the inserted row shift down by one cell, regardless of which column the entities are in. Similarly, when the values in a spreadsheet are sorted according to the values in a first column, if an entity in a particular row of the first column shifts up by, say, five cells, then the entities in the same row of the other columns also shift up by the same amount. Therefore, if it is determined that a key has shifted by a particular amount between time points then it can be assumed that the entities in the other columns on the same row as the key have shifted in the same way as the key.

As illustrated in FIG. 21, in a next step 133, offsets are applied to the spreadsheet file by an offset applicator before the file is compared to a version of the file at a different time point in a next step 135. When using the cell-by-cell comparison described above, when comparing the two XML files for the two time points, for each row corresponding to a non-stationary key, the appropriate offset is added to the row number represented in the XML. This results in a comparison between two equivalent shifted values rather than two values which happen to occupy the same cell at the two time points. All new keys can be added from the current time point file, ignoring the previous time point file. All deleted keys can be added from the previous time point file ignoring the current time point file. Any key which is identified as a duplicate key is ignored during the processing because correct key identification between the two time points cannot be assured.

In the example described above, one or more columns were selected to define keys to take into account row insertion and deletion operations and sort operations in the vertical direction. However, it can be seen that a similar technique may be employed whereby one or more rows are selected to define keys to take into account column insertion and deletion operations and sorting operations in the horizontal direction. It will also be appreciated by the skilled person that both rows and columns could be selected in combination.

Compressed Formula Storage

The system described above and illustrated in the figures may also be configured to process spreadsheets to provide for compressed formula storage. The formula storage compression process is preferably performed automatically by the system. For example, each spreadsheet stored within the system may be automatically retrieved and processed according to the invention during an auditing phase. In some embodiments however the compression process may be performed specifically in response to a user command and possibly on selected spreadsheets.

The compressed formula storage processing of spreadsheets may be performed by suitable software stored on and executed by one or more of the servers 44.

When it has been determined that a spreadsheet is to be processed, the relevant spreadsheet is retrieved from within the network 12 under the control of the servers 44. As mentioned above, file storage within the system comprises local storage provided by each client computer 10 and the or each file server 14 on the network 12. During processing of a spreadsheet, a determining unit determines each unique formula occurring within the spreadsheet and a formula table is constructed which stores each unique formula occurring in the spreadsheet in a first store region together with a unique formula ID for each formula in a second store region. As described in greater detail below, in this way, the formulas occurring within the spreadsheet may be replaced with their corresponding ID values as defined by the formula table by a replacing unit. Since an entry in the formula table is required only for each unique formula, rather than each instance of a formula occurring in the spreadsheet, and since formula IDs occupy significantly smaller space than formulas themselves, a significant reduction in storage is made. In some spreadsheets, up to 99.5% of the formulas within the spreadsheet are duplicated. By storing only unique formulas rather than each instance of a formula occurring in a spreadsheet, an almost 99.5% saving of space is made.

In a preferred embodiment, the formula table comprises one or more entries, each entry corresponding to a unique formula within a spreadsheet. Each entry in the formula table comprising three fields. The three fields have the following form:

[CurrentFormula] [nvarchar] (2048)
[FormulaID] [int] NOT NULL
[FormulaCheckSum] AS (binary_checksum([CurrentFormula]))

The first field, labelled CurrentFormula, stores a character string representing the formula corresponding to the table entry. In this example, CurrentFormula is a variable of the type nvarchar (a data type storing character strings of variable length) having up to 2048 characters. For example, one CurrentFormula may be the string "=A2+B3+SUM(D1: D3)".

The second field, labelled FormulaID, stores an identification value which uniquely identifies the formula in the CurrentFormula field. Accordingly, there is a one-to-one correspondence between the formula IDs and unique formulas in the spreadsheet so that any formula in the spreadsheet can be identified using its corresponding formula ID. In this example, FormulaID is a variable of the type int (a data type storing a variable integer value) which has a non null value. For example, one FormulaID may have the value "31".

The third field, labelled FormulaCheckSum, stores a value derived from the CurrentFormula field which is used to facilitate comparisons between formulas as described in greater detail below.

Figure 20:
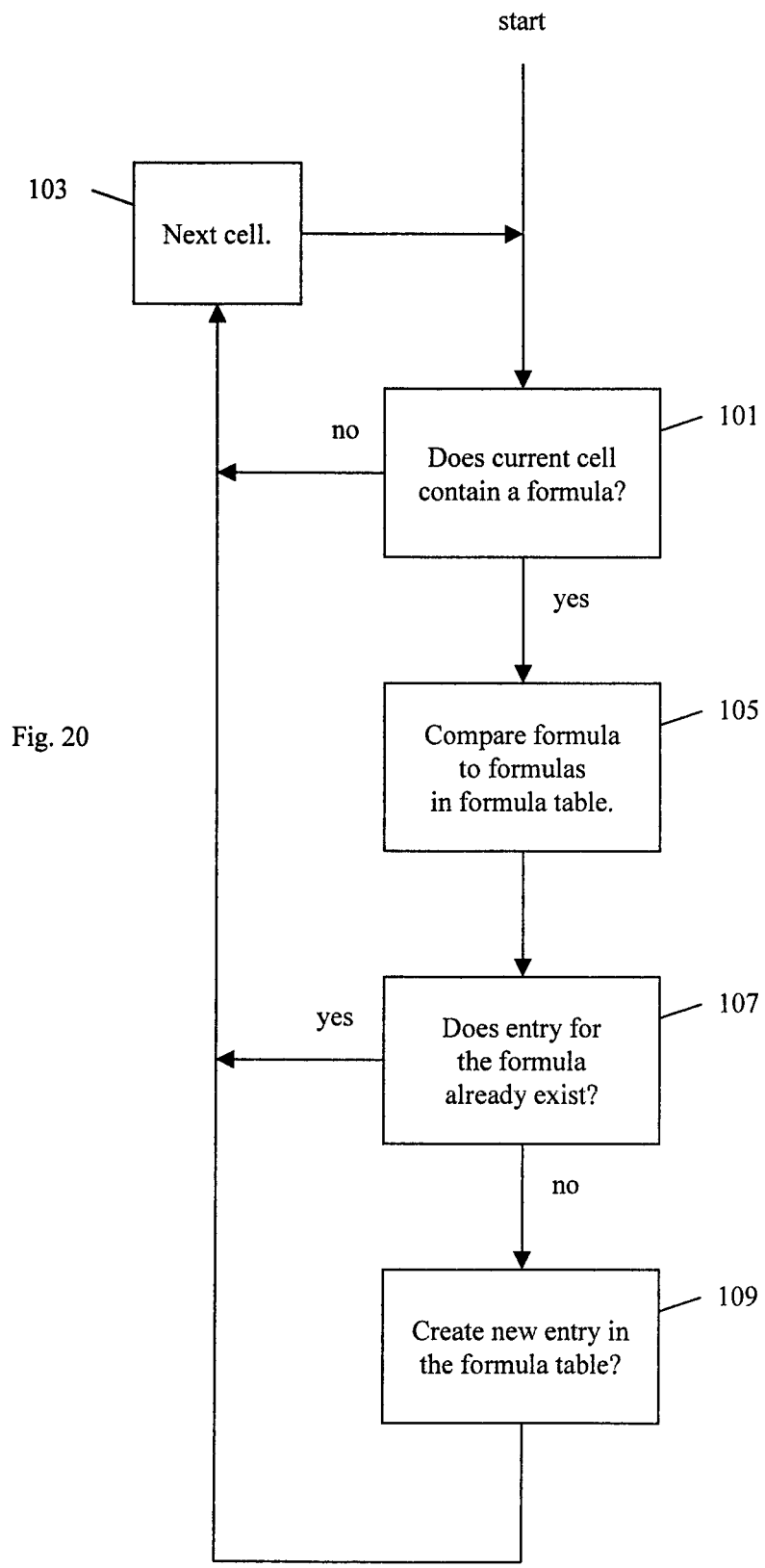
FIG. 20 is a flow diagram of a method used to provide compressed formula storage.

Prior to processing of any spreadsheets, the formula table is empty. The table is then populated during processing of one or more spreadsheets. In one exemplary method, now described with reference to the flow chart of FIG. 20, processing of a spreadsheet comprises the following steps. Each cell in the spreadsheet is iterated through in turn by a searching unit. In a first step 101, a first cell is checked by a formula determining unit to determine whether the cell contains a formula or another form of data. In one embodiment, each cell comprises associated data type information indicating the type of data stored in each cell. In this case, the data type information of the cell may be analysed to determine whether the cell contains a formula.

If it is determined that the cell does not contain a formula then the next cell is searched 103. If it is determined that the cell does contain a formula, in a next step 105, the formula is compared to the set of formulas stored in the formula table by a table comparing unit. In a next step 107, a formula duplication determining unit determines whether an entry for the formula already exists in the formula table.

The comparison between formulas in the spreadsheet and formulas in the formula table may be performed by a comparator by comparing formula character strings using any suitable comparison algorithm. In the preferred embodiment, in order to facilitate comparing formulas, each entry in the formula table comprises a third field arranged to store a numerical value derived from the formula string stored in the first field. This value should preferably be derived in such a way that each unique formula string produces a unique value. In one embodiment, the derived value is a binary checksum value comprising a numerical value derived from the formula character string by any suitable known checksum function. When a new entry is added to the formula table, the binary checksum value of the formula being stored is calculated and stored together with the formula string. In this example, the binary checksum value is calculated using the software function binary_checksum taking the variable CurrentFormula as an argument. Different formulas will produce different checksums.

In order to determine whether a formula in the spreadsheet comprises an entry in the formula table, the binary checksum value of the formula is computed by a processor and compared with the binary checksum values stored in the formula table. Since it is easier to compare two numerical values than it is to compare two character strings, using binary checksum values provides a significant increase in computational efficiency.

If an entry for the formula contained in the current cell already exists in the formula table then the next cell in the spreadsheet is searched 103. If an entry for the formula does not exist in the formula table then a new entry is created in a next step 109 by an entry creating unit. In this step, the character string representing the formula is stored in the first field of the new entry, a new unique formula ID is assigned to the formula and stored in the second field of the new entry, and the binary checksum of the formula string is computed and stored in the third field of the new entry.

The next cell is then searched 103 and the above process is repeated until each cell in the spreadsheet has been processed.

Once the formula table has been constructed, each formula contained in the spreadsheet is replaced by a replacing unit by its corresponding formula ID as defined in the formula table. Alternatively, the formulas contained in the spreadsheet may be replaced by the corresponding formula ID as the formula table is constructed.

In one embodiment, the operations involved in processing the spreadsheet file to construct the formula table are performed by a formula ID helper class. In the system described herein, this class is derived from the parent class, the structure of which is illustrated in FIG. 3.

Once a spreadsheet has been processed to achieve compressed formula storage, in order to reconstruct the original spreadsheet, each cell in the spreadsheet is iterated through in turn, and where a cell contains a formula ID, the ID is replaced with the corresponding formula string as defined by the formula table.

In many cases, two or more formulas appearing in a spreadsheet have the same form (i.e. represent the same mathematical function), but the arguments occurring within the formulas, referring to specific cells, are different. However, in some cases, in each formula, the positional relationship between the cells referred to in the arguments and the cell containing the formula may be the same. This is the case for example in Microsoft Excel when a formula is created for a cell within a column and that formula is dragged down and copied into the cells beneath. The table below illustrates part of a spreadsheet in which this process has occurred.

|   | ... | D | E | |
|---|---|---|---|---|
|   |   | . | . |   |
|   |   | . | . |   |
|   |   | . | . |   |
| 5 | ... | 12 | =2 * (E4 + D5) | ... |
| 6 | ... | 15 | =2 * (E5 + D6) | ... |
| 7 | ... | 7 | =2 * (E6 + D7) | ... |
| 8 | ... | 64 | =2 * (E7 + D8) | ... |
|   |   | . | . |   |
|   |   | . | . |   |
|   |   | . | . |   |

Although each formula in column E is different in that different arguments are used, each formula is in the form $2*(a_1+a_2)$ where $a_{a1}$ and $a_2$ are arguments. Furthermore, in each formula, the first argument is always the cell directly above the cell in which the formula is located and the second argument is always the cell directly to the left of the cell in which the formula is located. In the preferred embodiment, two or more formulas are considered to be the same if, in each formula, the positional relationship between the cells referred to in the arguments and the cell containing the formula are the same. This is a less stringent condition than specifying that two or more formulas are the same if the character string representing the formulas are identical. However, if the more stringent condition were used then most formulas occurring within a typical spreadsheet would be unique and only a small saving of space would be made.

In order to maximise the effectiveness of compressed formula storage, before a comparison is made between two formulas, the formulas should be first represented in a relative notation style (such as R1C1 or any other suitable style). This ensures that the formula strings do not contain specific cell address information which could cause the majority of formulas in the spreadsheet to be unique. Accordingly, when a comparison is made between two formulas, the formula character strings are first converted to the relative notation style before a comparison is made. When a binary checksum values is calculated, the formula character string from which the value is derived is first converted to the relative notation style before the binary checksum value is computed.

In the embodiment described above, an existing spreadsheet is processed according to the invention to obtain a spreadsheet having compressed formula storage. Alternatively, the compressed storage formula technique according to the invention could be applied dynamically as a spreadsheet is created and edited. For example, if a spreadsheet is edited by a user to insert a formula into a cell, the system may be arranged to determine at that time whether an entry in the formula table exists for that formula. If so, instead of inserting the formula into the spreadsheet the corresponding formula ID is inserted. If not, a new entry in the formula table is created at that time.

The formula tables may be stored and managed by the file server. In a preferred embodiment the formula tables are stored in separate data files to the spreadsheet files. However, in an alternative embodiment, a formula table for a spreadsheet may be stored within the spreadsheet file itself, such as within a header of the spreadsheet file. This arrangement provides for easier exporting of files since when a spreadsheet file is transferred, the necessary formula table information already forms part of the file. In the case where a separate formula table file is provided, when a file is transferred, the necessary formula table file is transferred together with the spreadsheet file so that the original spreadsheet can be reconstructed. In one embodiment, a separate formula table is created for each individual spreadsheet. However, since the same formulas may be shared over several different spreadsheets, preferably, in order to maximise compression a single formula table is used for several or all spreadsheets.

The methods described above may be implemented by suitable software stored in a memory, comprising computer executable code for execution by a suitable processor.

Microsoft and Excel are trade marks of Microsoft Corporation.

Having described the preferred embodiments of the invention, it will now become apparent to one of ordinary skill in the art that other embodiments incorporating their concepts may be used. It is felt, therefore, that these embodiments should not be limited to disclosed embodiments but rather should be limited only by the spirit and scope of the appended claims.

What is claimed is:

1. A system for monitoring and auditing data in one or more spreadsheets, each of the one or more spreadsheets comprising a plurality of cells, the system comprising:
    a file store within which files containing spreadsheet data can be stored;
    a database stored in a computer hardware memory module separately from the file store, wherein the database is a programmed database that supports computer application for performing specific actions on data stored within the database;
    database building means for loading the database with the content of the one or more spreadsheet files; and
    monitoring means, the monitoring means being operative to continuously detect changes in spreadsheet data within the file store, and to record the changes in the database, the changes including changes in formulae in cells of the database;
    the monitoring means including comparison means operative to repeatedly compare successive versions of a file in the file store by comparing each cell in a current version of the file with a corresponding cell in a previous version of the file and, if it is determined that the content of a cell has changed, creating a record of the change in said database, the record including data that classifies the change, such that the database contains a history of changes for recovering an earlier state of the spreadsheet starting with the file as it is in the file store.

2. A system according to claim 1 in which the change is classified as being one or more of: data added, data changed, data deleted, function added, function changed, function deleted, data to function, function to data, cell error, function recalculation, script changes, external reference changes, named range changes, link changes, password changes, sheet added, sheet deleted, sheet renamed, spreadsheet renamed, spreadsheet deleted, spreadsheet added.

3. A system according to claim 1 in which the record includes a time stamp indicating the time at which the change was made.

4. A system according to claim 1 in which the record includes data that identifies a user who made the change.

5. A system according to claim 1 in which a file being monitored is parsed and converted to XML prior to processing by the comparison means.

6. A system according to claim 1, in which the comparison means detects both changes of values and of formulae in cells.

7. The system of claim 1 wherein the monitoring means is operative to compare successive versions of the file by applying cell movements, cell insertions, and/or cell deletions to one version of the file and comparing each cell in the one version of the file with a corresponding cell in another version of the file.

8. A system for monitoring and auditing data in one or more spreadsheets, each of the one or more spreadsheets comprising a plurality of cells, the system comprising:
    a file store within which files containing spreadsheet data are stored;
    a database stored in a computer hardware memory module separately from the file store, wherein the database is a programmed database that supports computer applications for performing specific actions on data stored within the database;
    a database building means for loading the database with the content of the one or more spreadsheet files; and
    monitoring means, the monitoring means being operative to continuously detect changes in spreadsheet data within the file store, and to record the changes in the database, the changes including changes in formulae in cells of the database;
    the monitoring means including comparison means operative to repeatedly compare a current version of a file in the file store with a previous version of the file by comparing each cell in the current version of the file with a corresponding cell in the previous version of the file and, if it is determined that the content of the cell has changed, creating a record of that change in the database, the record including data that classifies the change, such that the database contains a history of changes for recovering an earlier state of the spreadsheet.

9. A system according to claim 8 in which the change is classified as being one or more of: data added, data changed, data deleted, function added, function changed, function deleted, data to function, function to data, cell error, function recalculation, script changes, external reference changes, named range changes, link changes, password changes, sheet added, sheet deleted, sheet renamed, spreadsheet renamed, spreadsheet deleted, spreadsheet added.

10. A system according to claim 8 in which the record includes a time stamp indicating the time at which the change was made.

11. A system according to claim 8 in which the record includes data that identifies a user who made the change.

12. A system according to claim 8 in which a file being monitored is parsed and converted to XML prior to processing by the comparison means.

13. A system according to claim 8, in which the comparison means detects both changes of values and of formulae in cells.

14. The system of claim 8 wherein the comparison means is operative repeatedly compare the current version of the file with the previous version of the file by applying cell movements, cell insertions, and/or cell deletions to the previous version of the file and comparing each cell in the previous version of the file with a corresponding cell in the current version of the file.

\* \* \* \* \*